United States Patent
Chung et al.

(10) Patent No.: US 12,079,037 B2
(45) Date of Patent: Sep. 3, 2024

(54) ELECTRONIC DEVICE

(71) Applicant: Huawei Technologies Co., Ltd., Shenzhen (CN)

(72) Inventors: Chia-Hsing Chung, Shenzhen (CN); Qinna Chen, Shenzhen (CN); Qinghai Liang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 222 days.

(21) Appl. No.: 17/638,468

(22) PCT Filed: Aug. 12, 2020

(86) PCT No.: PCT/CN2020/108583
§ 371 (c)(1),
(2) Date: Feb. 25, 2022

(87) PCT Pub. No.: WO2021/036787
PCT Pub. Date: Mar. 4, 2021

(65) Prior Publication Data
US 2023/0009765 A1    Jan. 12, 2023

(30) Foreign Application Priority Data
Aug. 30, 2019   (CN) .......................... 201910817869.8

(51) Int. Cl.
*G06F 1/16*        (2006.01)
(52) U.S. Cl.
CPC .......... *G06F 1/1652* (2013.01); *G06F 1/1641* (2013.01)

(58) Field of Classification Search
CPC .... G06F 1/1652; G06F 1/1641; G06F 1/1616; G06F 1/1662; G06F 1/1681; G06F 1/1626; G09F 9/301
See application file for complete search history.

(56) References Cited

U.S. PATENT DOCUMENTS

| | | | | |
|---|---|---|---|---|
| 9,983,424 | B2 * | 5/2018 | Kim | H10K 50/84 |
| 10,143,098 | B1 * | 11/2018 | Lee | H04M 1/022 |
| 10,164,208 | B2 * | 12/2018 | Lee | B32B 5/145 |
| 10,490,771 | B2 * | 11/2019 | Kim | H10K 50/844 |

(Continued)

FOREIGN PATENT DOCUMENTS

| | | |
|---|---|---|
| CN | 203761701 U | 8/2014 |
| CN | 205454263 U | 8/2016 |

(Continued)

*Primary Examiner* — Rockshana D Chowdhury
(74) *Attorney, Agent, or Firm* — Slater Matsil, LLP

(57) ABSTRACT

The application discloses an electronic device, including a flexible display, a first housing, a second housing, and a flexible connecting piece, where two sides of the flexible connecting piece are connected to the first housing and the second housing, and the flexible display is fastened to the first housing, the flexible connecting piece, and the second housing. A plurality of first slits are disposed on a side that is of the first housing and that faces away from the flexible display; a plurality of second slits are disposed on a side that is of the second housing and that faces away from the flexible display; a plurality of third slits are disposed on a side that is of the flexible connecting piece and that faces away from the flexible display; and extension directions of the first slit, the second slit, and the third slit are parallel to a first direction.

16 Claims, 26 Drawing Sheets

(56) References Cited

U.S. PATENT DOCUMENTS

| | | | |
|---|---|---|---|
| 10,866,618 B2 * | 12/2020 | Yeom | G06F 1/1618 |
| 2017/0357289 A1 | 12/2017 | Ahn | |
| 2018/0097197 A1 * | 4/2018 | Han | H05K 5/03 |
| 2018/0107250 A1 * | 4/2018 | Cho | G06F 1/1652 |
| 2018/0124937 A1 * | 5/2018 | Choi | G06F 1/1681 |
| 2018/0190936 A1 * | 7/2018 | Lee | B32B 25/20 |
| 2019/0131553 A1 * | 5/2019 | Park | G06F 1/1652 |
| 2020/0166970 A1 * | 5/2020 | Yeom | G06F 1/1618 |

FOREIGN PATENT DOCUMENTS

| | | |
|---|---|---|
| CN | 107403590 A | 11/2017 |
| CN | 206757466 U | 12/2017 |
| CN | 207115245 U | 3/2018 |
| CN | 108417152 A | 8/2018 |
| CN | 108600480 A | 9/2018 |
| CN | 108845621 A | 11/2018 |
| JP | 2014161009 A | 9/2014 |

\* cited by examiner

ELECTRONIC DEVICE

CROSS-REFERENCE TO RELATED APPLICATIONS

This application is a national stage of International Application No. PCT/CN2020/108583, filed on Aug. 12, 2020, which claims priority to Chinese Patent Application No. 201910817869.8, filed on Aug. 30, 2019. Both of the aforementioned applications are hereby incorporated by reference in their entireties.

TECHNICAL FIELD

Embodiments of this application relate to the field of electronic product technologies, and in particular, to an electronic device.

BACKGROUND

As flexible display technologies rapidly improve and users impose requirements on multi-scenario applications of electronic devices such as notebook computers, flexible displays and foldable housing structures are increasingly used for the electronic devices, to satisfy requirements of carrying small-sized electronic devices and implementing display on large screens of the electronic devices. However, to make an electronic device with a screen folded inward foldable, a plurality of gaps are disposed on a bent part of a rotating shaft assembly of the electronic device. As a result, appearance consistency of the electronic device is low, and user experience is undesirable.

SUMMARY

An objective of this application is to provide an electronic device, where the electronic device has relatively high appearance consistency.

An embodiment of this application provides an electronic device. The electronic device includes a flexible display, a first housing, a second housing, and a flexible connecting piece. One side of the flexible connecting piece is connected to the first housing, and the other side of the flexible connecting piece is connected to the second housing. The flexible connecting piece can be deformed, so that the first housing and the second housing are folded or flattened relative to each other. The flexible connecting piece may be made of a soft material such as silica gel. The flexible display is seamlessly fastened to the first housing, the flexible connecting piece, and the second housing.

A plurality of first slits are disposed on a side that is of the first housing and that faces away from the flexible display. A plurality of second slits are disposed on a side that is of the second housing and that faces away from the flexible display. A plurality of third slits are disposed on a side that is of the flexible connecting piece and that faces away from the flexible display, and a convex part is formed between two adjacent third slits. Extension directions of the first slit, the second slit, and the third slit are parallel to a first direction.

When the first housing and the second housing are folded relative to each other, the flexible display is folded and is located inside the first housing, the flexible connecting piece, and the second housing, and a plurality of convex parts of the flexible connecting piece are opened from each other by using the plurality of third slits.

When the first housing and the second housing are flattened relative to each other, the flexible display is flattened, a plurality of convex parts of the flexible connecting piece are closed to each other, the plurality of first slits, the plurality of third slits, and the plurality of second slits are sequentially arranged in a second direction, and the second direction is perpendicular to the first direction.

In this embodiment, the flexible connecting piece is provided with the plurality of third slits, so that the plurality of convex parts can be opened from each other and closed to each other to flatten and bend the flexible connecting piece. In this case, the first housing and the second housing can be flattened and folded relative to each other. Because the first slits, the third slits, and the second slits are parallel to each other and are sequentially arranged, the first slits, the third slits, and the second slits can jointly form an appearance texture of the electronic device, and the texture is regular and beautiful. Because the third slits can be naturally fused to the appearance texture of the electronic device to implement concealment, the electronic device has relatively high appearance consistency. In addition, in a process in which the first housing and the second housing rotate relative to each other by using the flexible connecting piece, the appearance texture of the electronic device can naturally change. This is conducive to improving user experience.

In addition, the flexible display is fastened to the first housing, the flexible connecting piece, and the second housing. Because the flexible display needs to be flattened and folded, the flexible connecting piece is used to make the first housing and the second housing flattened and folded relative to each other. The flexible connecting piece has a simple structure. Compared with a hinged-type rotating shaft, the flexible connecting piece has a smaller size and is more compact, making the electronic device become lighter and thinner.

In some embodiments, the flexible display may include a display layer and a support layer. The support layer is located on a non-light-emitting side of the display layer. The support layer is made of a material with specific rigidity, such as an elastic metal material. The support layer is configured to support the display layer, so that the flexible display has specific strength and flatness. This mitigates a risk of collapse or inward sinking of the flexible display caused when the flexible display is subject to external force (for example, a pressing operation or a touch operation performed by a user on the flexible display), thereby improving reliability of the flexible display, and prolonging a service life of the flexible display.

In some embodiments, a depth of the third slit is greater than a depth of the first slit and a depth of the second slit. In this embodiment, the depth of the third slit is relatively large, to satisfy a bending requirement of the flexible connecting piece. The depth of the first slit and the depth of the second slit are relatively small, so that not only a partial texture of the appearance of the electronic device can be formed, but also a footprint of the first slit on the first housing and a footprint of the second slit on the second housing can be reduced. In this way, in the first housing and the second housing, there is more space for arranging other components, without significantly reducing structural strength of the first housing and the second housing. Therefore, the electronic device has relatively high reliability.

In some embodiments, the depth of the first slit may be the same as the depth of the second slit. In some other embodiments, the depth of the first slit may be different from the depth of the second slit.

In some embodiments, the first housing includes a back face and two side faces respectively connected to two sides of the back face, and the first slit extends from one of the side faces to the other side face through the back face. The second housing includes a back face and two side faces respectively connected to two sides of the back face, and the second slit extends from one of the side faces to the other side face through the back face.

In this embodiment, the first slit extends to the side face of the first housing, and the second slit extends to the side face of the second housing. Therefore, from a side view of the electronic device, appearance of the third slit on the flexible connecting piece is also similar to appearance of the first slit and the second slit. Therefore, the third slit can be well fused to the appearance texture of the electronic device.

In some embodiments, the plurality of first slits, the plurality of third slits, and the plurality of second slits are arranged at equal intervals. The plurality of third slits are arranged at equal intervals, so that force exerted on the flexible connecting piece when the flexible connecting piece is being bent and expanded is more uniform, and the flexible connecting piece has higher reliability and a longer service life. When the first housing and the second housing of the electronic device are flattened relative to each other, the plurality of first slits, the plurality of third slits, and the plurality of second slits are arranged at equal intervals, so that the third slits can be better coupled to the first slits and the second slits visually, and the electronic device has higher appearance consistency.

In some other embodiments, the plurality of third slits are arranged at equal intervals, and arrangement density of the plurality of first slits and the plurality of second slits gradually changes. In some examples, in a direction in which the plurality of first slits and the plurality of second slits are close to the plurality of third slits, the arrangement density of the plurality of first slits progressively increases, and the arrangement density of the plurality of second slits progressively increases. In this way, the third slits can be fused to the appearance of the electronic device, and a quantity of first slits on the first housing and a quantity of second slits on the second housing can be reduced, so that the first housing and the second housing have higher structural strength. In some other examples, in the direction in which the plurality of first slits and the plurality of second slits are close to the plurality of third slits, the arrangement density of the plurality of first slits progressively decreases, and the arrangement density of the plurality of second slits progressively decreases. In still some other examples, the plurality of first slits and the plurality of second slits may alternatively be arranged in another manner such as random arrangement, so that the appearance of the electronic device is more diversified.

In some embodiments, the first housing and the second housing each include a substrate and a flexible cladding layer, and an outer side of the substrate is coated with the flexible cladding layer. The first housing and the second housing may be fabricated by using an injection molding process. A material of the flexible cladding layer may be but is not limited to silica gel, leather, or microfiber. A first gap may be formed at the flexible cladding layer of the first housing. A second gap may be formed at the flexible cladding layer of the second housing.

In some embodiments, a first slit pattern is formed on the side that is of the first housing and that faces away from the flexible display, the first slit pattern includes the first slit and a fourth slit, and the fourth slit intersects with or is parallel to the first slit. The fourth slit may be a straight line or a curve. The first slit pattern may further include other slits. A second slit pattern is formed on the side that is of the second housing and that faces away from the flexible display, a third slit pattern is formed on the side that is of the flexible connecting piece and that faces away from the flexible display, and the third slit pattern, the second slit pattern, and the first slit pattern are the same. In this embodiment, the third slit pattern on the flexible connecting piece can be well fused with the first slit pattern of the first housing and the second slit pattern of the second housing, so that the electronic device has higher appearance consistency.

In some embodiments of this application, the electronic device further includes a limiting structure, and the limiting structure is configured to assist the first housing and the second housing in keeping flattened relative to each other. The limiting structure can assist the first housing and the second housing in keeping a relatively stable relative position relationship when the first housing and the second housing are flattened relative to each other. Therefore, the flexible display can keep in a stable large-screen display state, thereby improving reliability of the electronic device.

In some embodiments, the electronic device further includes a plurality of magnetic attachment assemblies. At least one magnetic attachment assembly is correspondingly disposed in each third slit. The at least one magnetic attachment assembly includes one or more magnetic attachment assemblies. Each magnetic attachment assembly includes a first magnetic attachment member and a second magnetic attachment member that are attached to each other. The first magnetic attachment member and the second magnetic attachment member are respectively disposed in two convex parts located on two sides of the third slit, and the first magnetic attachment member and the second magnetic attachment member are disposed opposite to each other. The first magnetic attachment member and the second magnetic attachment member may be magnets with different polarities. Alternatively, one of the magnetic attachment members may be a magnet and the other may be made of a ferromagnetic material.

In this embodiment, when the first housing and the second housing are flattened relative to each other, a plurality of convex parts of the flexible connecting piece are closed to each other, a first magnetic attachment member and a second magnetic attachment member in one magnetic attachment assembly are close to each other, and magnetic attachment force is generated between the two magnetic attachment members, so that all the plurality of convex parts of the flexible connecting piece keep in stable states, and the first housing and the second housing keep flattened relative to each other. In this embodiment, the plurality of magnetic attachment assemblies are disposed, so that the first housing and the second housing can keep flattened relative to each other. The plurality of magnetic attachment assemblies have simple structures and small sizes, making the flexible connecting piece become lighter and thinner. In addition, an implementation of keeping, by using the plurality of magnetic attachment assemblies, the first housing and the second housing flattened relative to each other is simple and highly reliable.

In addition, when the first housing and the second housing are folded relative to each other, the plurality of convex parts of the flexible connecting piece are away from each other, a first magnetic attachment member and a second magnetic attachment member in one magnetic attachment assembly are away from each other, and magnetic attachment force between the two magnetic attachment members is reduced. In this case, the electronic device may be provided with a fixing structure, so that the first housing and the second housing better keep folded relative to each other.

In some embodiments, the first housing forms a first channel, the second housing forms a second channel, the plurality of convex parts of the flexible connecting piece form a third channel, the third channel crosses the plurality of third slits, and the third channel is connected to the first channel and the second channel. The electronic device further includes a first memory metal piece and a second memory metal piece. When the first housing and the second housing are folded relative to each other, the first memory metal piece and the second memory metal piece are powered off, the first memory metal piece is located on the first channel, and the second memory metal piece is located on the second channel. When the first housing and the second housing are flattened relative to each other, the first memory metal piece and the second memory metal piece are powered on, the first memory metal piece is heated and elongated, one end of the first memory metal piece extends into the third channel, the second memory metal piece is heated and elongated, and one end of the second memory metal piece extends into the third channel.

In this embodiment, when the first housing and the second housing are folded relative to each other, the first memory metal piece and the second memory metal piece are powered off, the first memory metal piece is located on the first channel, and the second memory metal piece is located on the second channel. In this case, lengths of the first memory metal piece and the second memory metal piece are initial lengths and are relatively short, so that the first memory metal piece can be accommodated in the first channel, and the second memory metal piece can be accommodated in the second channel. This avoids interference on folding of the flexible connecting piece, thereby making the electronic device more reliable.

When the first housing and the second housing are flattened relative to each other, the first memory metal piece and the second memory metal piece are powered on, the first memory metal piece is heated and elongated, one end of the first memory metal piece extends into the third channel, the second memory metal piece is heated and elongated, and one end of the second memory metal piece extends into the third channel 1. In this embodiment, based on a characteristic that the first memory metal piece and the second memory metal piece are elongated after being powered on and heated, the first memory metal piece and the second memory metal piece extend into the flexible connecting piece to support the flexible connecting piece, so that the flexible connecting piece keeps in a flattened state, and the first housing and the second housing keep flattened relative to each other.

In some embodiments, when the first housing and the second housing are flattened relative to each other, the first memory metal piece and the second memory metal piece are powered on, and abut each other after being heated and elongated. In this case, the first memory metal piece and the second memory metal piece support the flexible connecting piece more fully. In some other embodiments, alternatively, after the first memory metal piece and the second memory metal piece are heated and elongated, there may still be a small gap between the first memory metal piece and the second memory metal piece.

In an embodiment, the plurality of convex parts of the flexible connecting piece form a deformation channel, and the deformation channel crosses the plurality of third slits. The electronic device further includes a memory metal piece, and the memory metal piece is accommodated in the deformation channel. One end of the memory metal piece is fixedly connected to the first housing, and the other end of the memory metal piece is fixedly connected to the second housing. When the first housing and the second housing are folded relative to each other, the memory metal piece is elongated and bent along with the flexible connecting piece. When the first housing and the second housing are flattened relative to each other, the memory metal piece is shortened and flattened after being powered on and heated.

In this embodiment, the memory metal piece can be deformed along with the flexible connecting piece under an action of external force, to support the flexible connecting piece when the first housing and the second housing are folded relative to each other. The memory metal piece can also be shortened and flattened after being powered on and heated, so that the flexible connecting piece can keep in a flattened state when the first housing and the second housing are flattened relative to each other.

In some embodiments, a concave-convex fitting structure is formed between two adjacent convex parts, and the concave-convex fitting structure includes a bump formed in one of the convex parts and a groove formed in the other convex part. When the first housing and the second housing are flattened relative to each other, the bump is embedded into the groove.

In this embodiment, when the first housing and the second housing are flattened relative to each other, the bump is embedded into the groove. In this case, a stable relative position relationship is kept between the two adjacent convex parts due to fitting between the bump and the groove, and the flexible connecting piece can keep in a flattened state, so that the first housing and the second housing keep flattened relative to each other. When the first housing and the second housing are folded relative to each other, the bump is detached from the groove, so that the flexible connecting piece can be freely bent.

In some embodiments, the electronic device further includes a rotating shaft and a third housing. The third housing is located on a side that is of the second housing and that is away from the first housing, one side of the rotating shaft is connected to the second housing, and the other side of the rotating shaft is connected to the third housing. The rotating shaft can be deformed, so that the second housing and the third housing are flattened, folded, or partially expanded relative to each other. The two sides of the rotating shaft can be expanded at a plurality of different angles and keep stable. In other words, the rotating shaft can make an angle between the second housing and the third housing adjustable. For example, the rotating shaft may be a hinged-type rotating shaft.

When the electronic device is in a third physical form, the second housing and the third housing are folded relative to each other, the first housing and the second housing are folded relative to each other, and the third housing is located between the first housing and the second housing. When the electronic device is in a first physical form, the third housing and the second housing are flattened relative to each other, and the second housing and the first housing are flattened relative to each other. When the electronic device is in a second physical form, the second housing and the third housing are partially expanded relative to each other, and the first housing and the second housing are flattened relative to each other.

In this embodiment, two different rotating shafts are used in cooperation in the electronic device: The flexible connecting piece is used as one of the rotating shafts, and flattening and folding of the electronic device are implemented by using a characteristic that a soft material is bendable; and the rotating shaft is used as the other rotating shaft, and a structure more complex than the flexible connecting piece may be used to implement flattening, folding, and partial expansion of the electronic device. The electronic device can have the third physical form, the second physical form, and the first physical form through cooperation of the rotating shaft and the flexible connecting piece. The electronic device in the third physical form has a smaller overall surface area due to use of a tri-fold structure, facilitating storage and carrying. The electronic device in the first physical form can display a screen of the electronic device in a maximized mode, to satisfy a requirement of the user for viewing on a large screen. The electronic device in the second physical form can implement free angle adjustment, and can be used in more diversified scenarios, thereby improving user experience.

In this embodiment, when the electronic device is in the third physical form, the third housing is located between the first housing and the second housing, and a bending radius of the flexible connecting piece between the first housing and the second housing is relatively large, so that a bending radius of a bent part that is of the flexible display and that is fastened to the flexible connecting piece is relatively large. In this way, the bent part of the flexible display is more easily bent and expanded along with the flexible connecting piece and is not prone to cause folds when being expanded.

In some embodiments, the electronic device further includes a keypad assembly, and the keypad assembly is fastened to the third housing. When the electronic device is in the first physical form, the third housing and the second housing are flattened relative to each other, the second housing and the first housing are flattened relative to each other, and an orientation of the keypad assembly is the same as an orientation of the flexible display.

In this embodiment, because the rotating shaft is connected between the second housing and the third housing and the rotating shaft can implement free angle adjustment and keep stable, when the electronic device is in the second physical form, the keypad assembly and the flexible display can be expanded at different angles depending on a user requirement, to satisfy input and viewing requirements of the user, and provide high comfort.

In some embodiments, the keypad assembly may include a plurality of keys. A key spacing (which refers to a distance between centers of two keys) between the plurality of keys is greater than 15 mm (millimeters). For example, the keypad assembly may be a full-size keypad, and a key spacing of the keypad assembly may be in a range of 19 mm±1 mm. In this way, the keypad assembly can satisfy input habits of most users, and help to improve use experience of the users. In some other embodiments, a touch layer may further be disposed on surfaces of the plurality of keys of the keypad assembly. In this case, a mechanical key input mode and a touch input mode are integrated into the keypad assembly. The user may implement input by pressing the plurality of keys, or may implement input by performing a touch operation, a tapping operation, a pressing operation, a sliding operation, or the like on the touch layer.

In some embodiments, the flexible display crosses the rotating shaft and extends to the third housing, a part that is of the flexible display and that is located on the third housing is integrated with a touch function and a display function, and the keypad assembly and the flexible display are separated from each other.

In this embodiment, the part that is of the flexible display and that is located on the third housing forms a first touch display region. The user may implement input by using the first touch display region and the keypad assembly, and input modes of the electronic device are more diversified, so that user experience is better.

In some embodiment, a part that is of the flexible display and that is located on the rotating shaft forms a second touch display region. The second touch display region and the first touch display region may be spliced to form a touch display region with a relatively large area, to display more controls. In this way, when a touch display requirement is satisfied, an area of the first touch display region can be properly reduced, so that a surface area of the third housing is relatively small, and the electronic device in the third physical form has a smaller surface area and is more convenient to carry and store.

In some embodiments, the electronic device further includes a touch display bar, and the touch display bar is fastened to the third housing and is located between the keypad assembly and the rotating shaft. In this embodiment, the user may implement input by using the touch display bar and the keypad assembly, and input modes of the electronic device are more diversified, so that user experience is better.

In some embodiments, the touch display bar may display editing controls (for example, a volume increase control, a volume decrease control, a brightness increase control, a brightness decrease control, a Bluetooth switch control, and a page switching control) and application controls (for example, a start control, a quick start bar control, an input bar control, a volume control, a network connection control, and a desktop display control). The user may implement input by touching a corresponding control. In some other embodiments, the touch display bar may display item controls (volume, brightness, color, expression, page switching, and the like). The user may select an item by touching a corresponding item control, and then adjust the corresponding item by performing a sliding operation on the touch display bar. For example, after the user selects a volume item by touching a volume control, a volume is turned up when the user slides right on the touch display bar, and the volume is turned down when the user slides left on the touch display bar. In still some other embodiments, the touch display bar includes a plurality of adjustment regions. A plurality of items can be adjusted by using the plurality of adjustment regions. For example, the plurality of adjustment regions include a volume adjustment region, a brightness adjustment region, a color adjustment region, an expression adjustment region, and a page switching region. The user can adjust different items by performing sliding operations in different adjustment regions. For example, if the user slides right in the brightness adjustment region, display brightness of the flexible display is increased; or if the user slides left in the brightness adjustment region, the display brightness of the flexible display is decreased.

In some embodiments, the electronic device further includes a touchscreen, and the touchscreen is fastened to the third housing. When the electronic device is in the first physical form, the third housing and the second housing are flattened relative to each other, the second housing and the first housing are flattened relative to each other, and an orientation of the touchscreen is the same as an orientation of the flexible display. When the electronic device is in the first physical form or the second physical form, the touchscreen may be used as an input part of the electronic device, and the flexible display may be used as a display part of the electronic device.

In some embodiments, the touchscreen may be a touch display, or may merely be a touchscreen, for example, a click pad or a hand-painted tablet. When the touchscreen is a touch display, in some usage scenarios, the touchscreen may also be used as a display part of the electronic device, and implement double-screen display together with the flexible display, to increase a display area of the electronic device.

In some embodiments, a thickness of the second housing and a thickness of the first housing progressively decrease in a direction that is parallel to the second direction and that is away from the third housing, and a thickness of the third housing is greater than or equal to a thickness of a side that is of the second housing and that is close to the third housing.

In this embodiment, the thicknesses of the second housing and the first housing are relatively small, making the electronic device become lighter and thinner. The thicknesses of the second housing and the first housing gradually decrease in the direction away from the third housing. This is also conducive to improving appearance consistency of the electronic device. When holding or supporting the electronic device, the user usually holds or supports the electronic device at the third housing of the electronic device. A decrease in the thicknesses of the second housing and the first housing is also conducive to improving stability of holding or supporting the electronic device during use of the electronic device, thereby helping to improve use experience.

In some embodiments, a thickness of the side that is of the flexible connecting piece and that is connected to the second housing is greater than a thickness of the side that is of the flexible connecting piece and that is connected to the first housing, and a thickness of the flexible connecting piece progressively decreases in a direction away from the second housing. The thickness of the side that is of the flexible connecting piece and that is connected to the second housing is less than or equal to a thickness of a side that is of the second housing and that is connected to the flexible connecting piece. In this case, the thickness of the second housing, the thickness of the flexible connecting piece, and the thickness of the first housing progressively decrease in the direction that is parallel to the second direction and that is away from the third housing.

In some embodiments, a thickness of the rotating shaft is less than or equal to the thickness of the third housing, and is greater than or equal to the thickness of the side that is of the second housing and that is close to the third housing.

Figure 28:
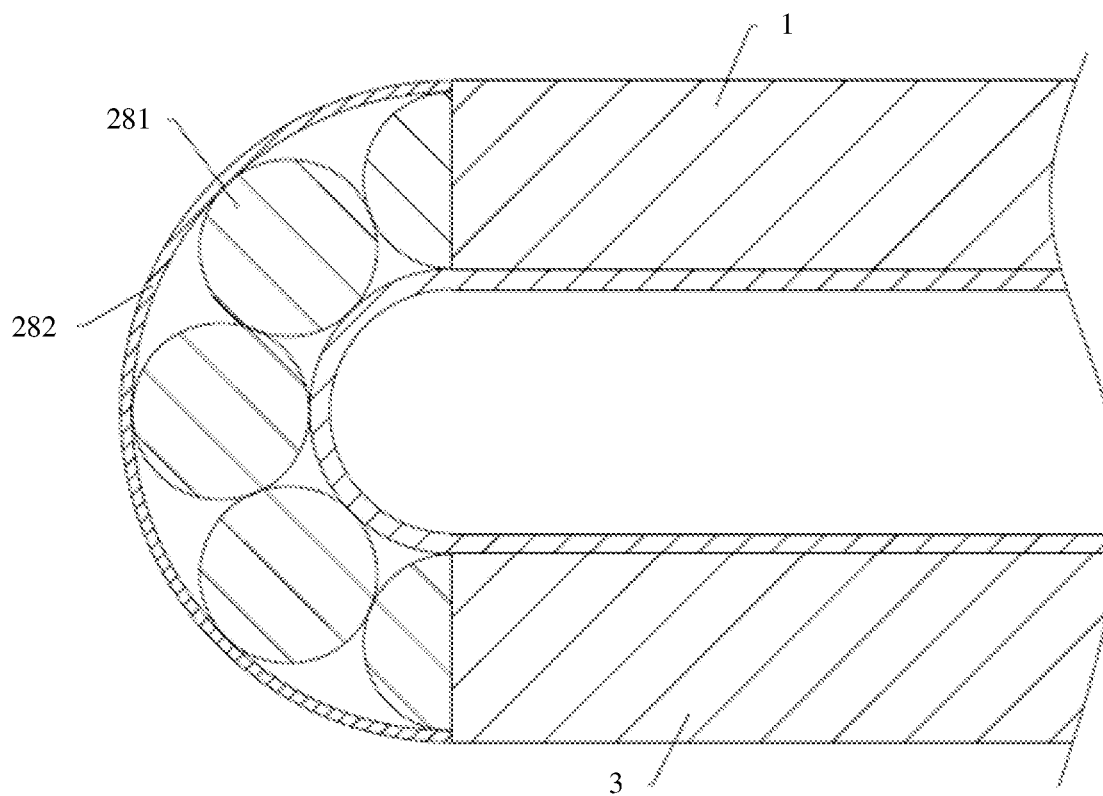
FIG. 28 is a schematic cross-sectional diagram of a part of a structure that is of the electronic device shown in FIG.
Figure 29:
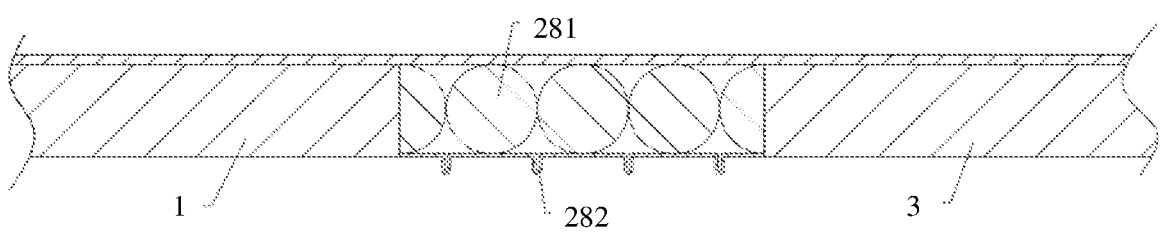
Figure 30:
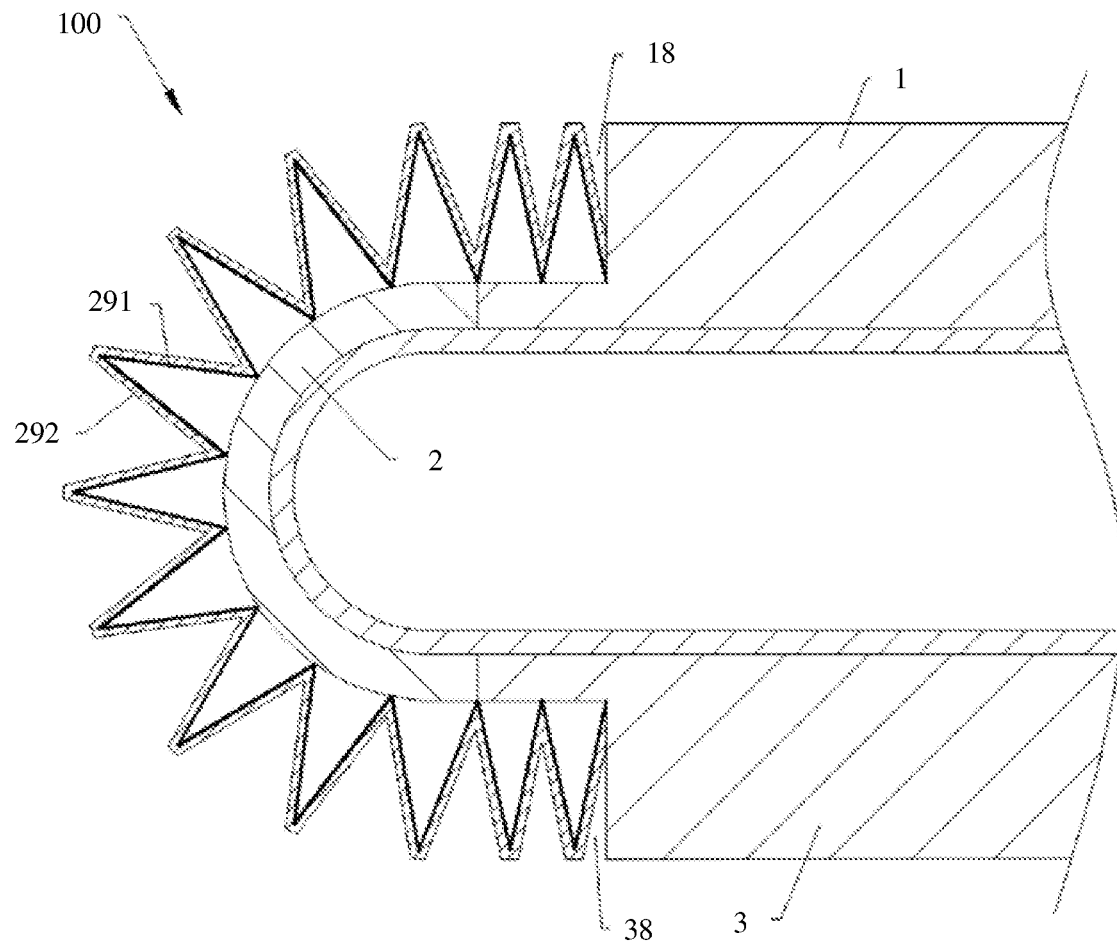
Figure 31:
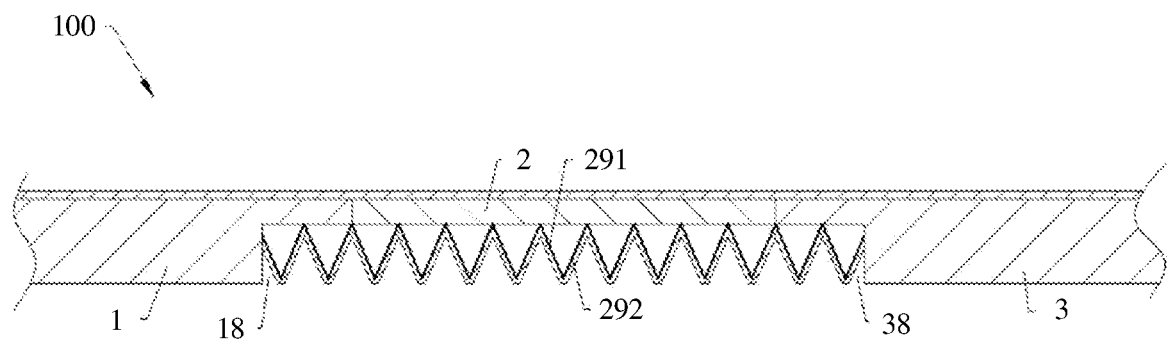

24 and that is obtained by cutting along a line F-F according to still some other embodiments;

FIG. 29 is a schematic diagram of a structure obtained after the structure shown in FIG. 28 is flattened;

FIG. 30 is a schematic diagram of an internal structure of an electronic device in a third physical form according to still another embodiment of this application; and FIG. 31 is a schematic diagram of a structure obtained after the structure shown in FIG. 30 is flattened.

DETAILED DESCRIPTION OF ILLUSTRATIVE EMBODIMENTS

The following describes the embodiments of this application with reference to the accompanying drawings in the embodiments of this application.

The embodiments of this application provide an electronic device. The electronic device includes at least two parts that can be folded and expanded relative to each other. In other words, the electronic device is of a foldable structure. The electronic device may be a notebook computer, a tablet computer, a mobile phone, or the like.

Figure 1:
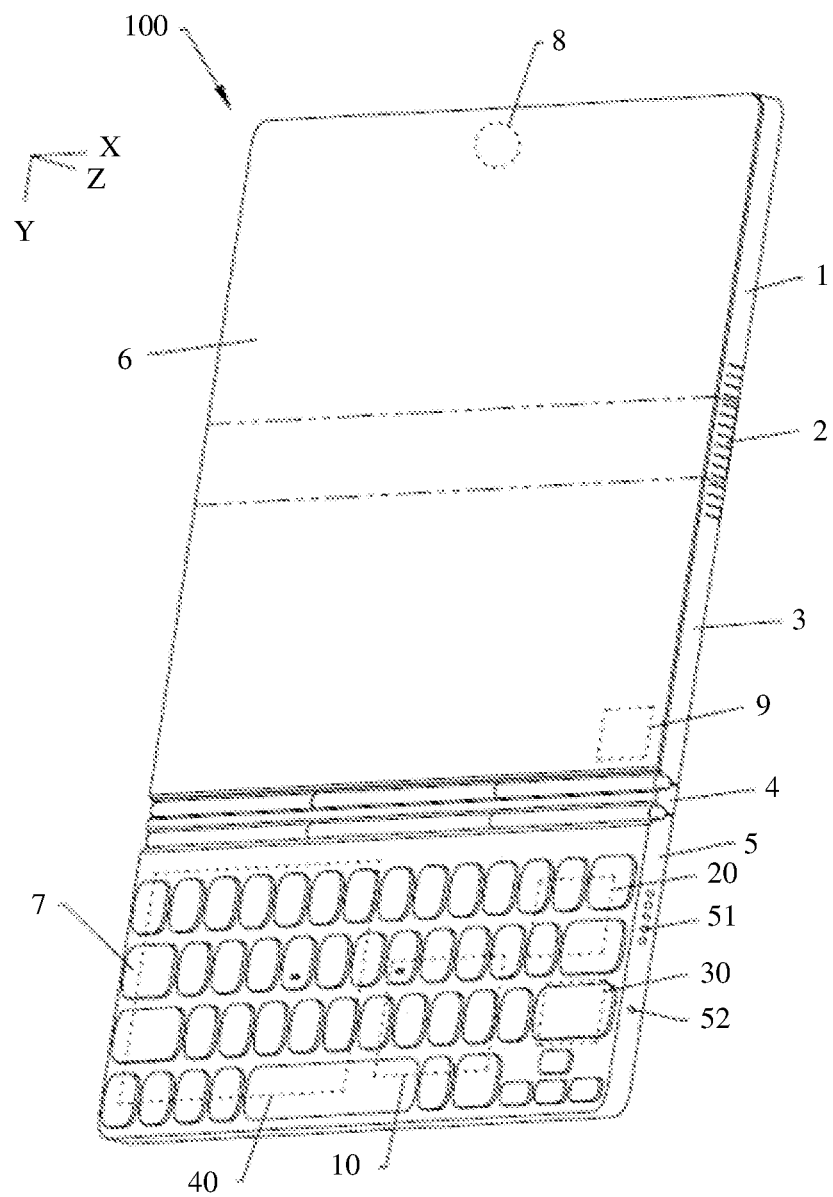
FIG. 1 is a schematic structural diagram of an electronic device in a first physical form according to an embodiment of this application.
Figure 2:
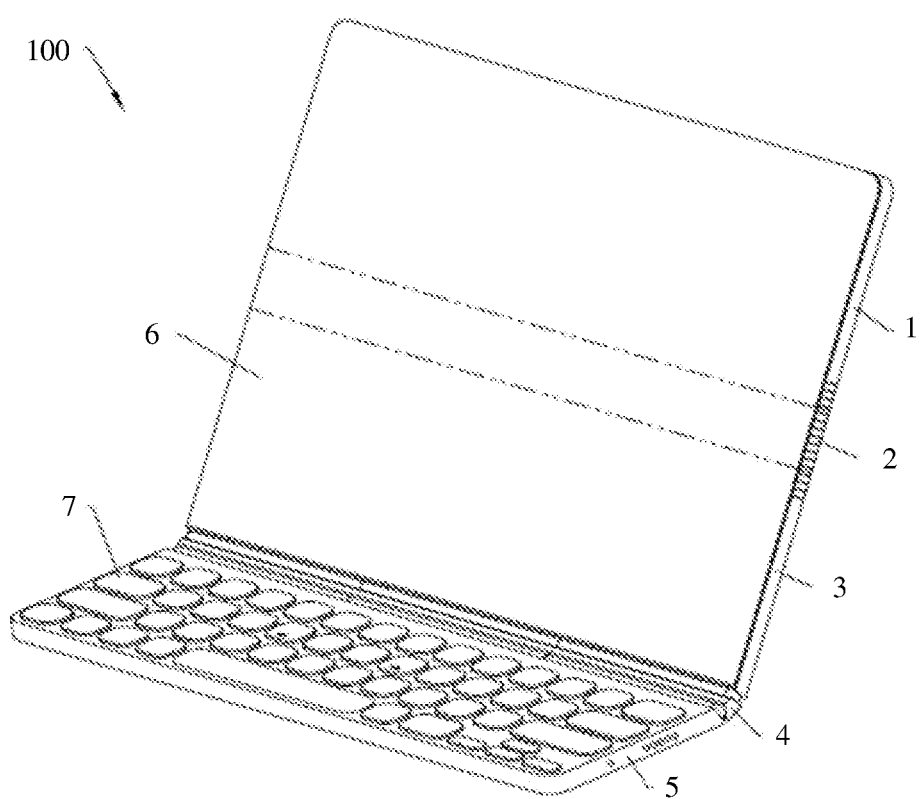
FIG. 2 is a schematic structural diagram of the electronic device shown in FIG. 1 that is in a second physical form.
Figure 3:
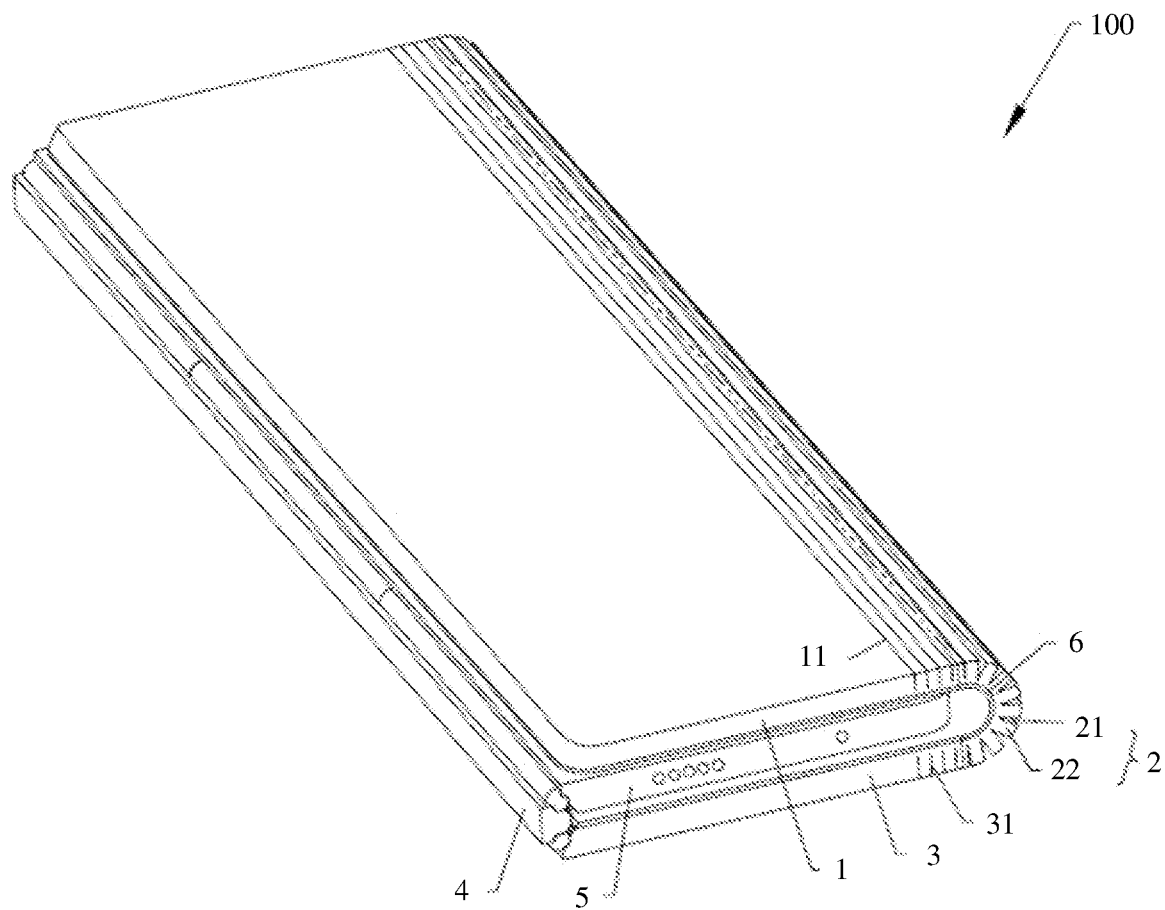
FIG. 3 is a schematic structural diagram of the electronic device shown in FIG. 1 that is in a third physical form.

FIG. 1 is a schematic structural diagram of an electronic device 100 in a first physical form according to an embodiment of this application. FIG. 2 is a schematic structural diagram of the electronic device 100 shown in FIG. 1 that is in a second physical form. FIG. 3 is a schematic structural diagram of the electronic device 100 shown in FIG. 1 that is in a third physical form. In the embodiment described in FIG. 1, a description is provided by using an example in which the electronic device 100 is a notebook computer. In the embodiment described in FIG. 1, a description is provided by using an example in which a width direction of the electronic device 100 is a first direction X, a length direction of the electronic device 100 is a second direction Y, and a thickness direction of the electronic device 100 is a third direction Z.

As shown in FIG. 1, the electronic device 100 includes a first housing 1, a flexible connecting piece 2, a second housing 3, a rotating shaft 4, and a third housing 5. The third housing 5 is located on a side that is of the second housing 3 and that is away from the first housing 1. The first housing 1, the second housing 3, and the third housing 5 are sequentially arranged in the second direction Y. The flexible connecting piece 2 is located between the first housing 1 and the second housing 3. An extension direction of the flexible connecting piece 2 is parallel to the first direction X. One side of the flexible connecting piece 2 is connected to the first housing 1, and the other side of the flexible connecting piece 2 is connected to the second housing 3. The rotating shaft 4 is located between the second housing 3 and the third housing 5. An extension direction of the rotating shaft 4 is parallel to the first direction X. One side of the rotating shaft 4 is connected to the second housing 3, and the other side of the rotating shaft 4 is connected to the third housing 5.

The flexible connecting piece 2 can be deformed, so that the first housing 1 and the second housing 3 are folded or flattened relative to each other. As shown in FIG. 1 and FIG. 2, the flexible connecting piece 2 is flattened, and the first housing 1 and the second housing 3 are flattened relative to each other. As shown in FIG. 3, the flexible connecting piece 2 is bent, and the first housing 1 and the second housing 3 are folded relative to each other. The flexible connecting piece 2 may be made of a soft material such as silica gel.

The rotating shaft 4 can be deformed, so that the second housing 3 and the third housing 5 are flattened, folded, or partially expanded relative to each other. As shown in FIG. 1, the rotating shaft 4 is flattened, and the second housing 3 and the third housing 5 are flattened relative to each other. As shown in FIG. 2, the rotating shaft 4 is partially bent, and the second housing 3 and the third housing 5 are partially expanded relative to each other. Two sides of the rotating shaft 4 can be expanded at a plurality of different angles and keep stable. In other words, the rotating shaft 4 can make an angle between the second housing 3 and the third housing 5 adjustable. For example, in FIG. 2, the angle between the second housing 3 and the third housing 5 is approximately 120°, and the second housing 3 and the third housing 5 may rotate relative to each other by using the rotating shaft 4, to adjust the angle between the second housing 3 and the third housing 5 to an angle in a range of 0 to 180°, such as 130°, 140°, or 150°. As shown in FIG. 3, the rotating shaft 4 is completely bent, and the second housing 3 and the third housing 5 are folded relative to each other. The rotating shaft 4 may be a hinged-type rotating shaft that can implement stepless adjustment.

In this embodiment, physical forms of the electronic device 100 include a first physical form, a second physical form, and a third physical form. As shown in FIG. 1, the electronic device 100 is in the first physical form, the third housing 5 and the second housing 3 are flattened relative to each other, and the second housing 3 and the first housing 1 are flattened relative to each other. The first physical form may also be referred to as a flattened form. As shown in FIG. 2, the electronic device 100 is in the second physical form, the second housing 3 and the third housing 5 are partially expanded relative to each other, and the first housing 1 and the second housing 3 are flattened relative to each other. The second physical form may also be referred to as a partially expanded form. As shown in FIG. 3, the electronic device 100 is in the third physical form, the second housing 3 and the third housing 5 are folded relative to each other, the first housing 1 and the second housing 3 are folded relative to each other, and the third housing 5 is located between the first housing 1 and the second housing 3. The third physical form may also be referred to as a folded form.

In this embodiment, two different rotating shafts are used in cooperation in the electronic device 100: The flexible connecting piece 2 is used as one of the rotating shafts, and flattening and folding of the electronic device 100 are implemented by using a characteristic that a soft material is bendable; and the rotating shaft 4 is used as the other rotating shaft, and a structure more complex than the flexible connecting piece 2 may be used to implement flattening, folding, and partial expansion of the electronic device 100. The electronic device 100 can have the third physical form, the second physical form, and the first physical form through cooperation of the rotating shaft 4 and the flexible connecting piece 2. The electronic device 100 in the third physical form has a smaller overall surface area due to use of a tri-fold structure, facilitating storage and carrying. The electronic device 100 in the first physical form can display a screen of the electronic device 100 in a maximized mode, to satisfy a requirement of a user for viewing on a large screen. The electronic device 100 in the second physical form can implement free angle adjustment, and can be used in more diversified scenarios, thereby improving user experience.

In some embodiments, as shown in FIG. 1 and FIG. 2, the electronic device 100 may further include a flexible display 6, and the flexible display 6 is seamlessly fastened to the first housing 1, the flexible connecting piece 2, and the second housing 3. When the electronic device 100 is in the first physical form and the second physical form, the flexible display 6 presents a planar large-screen structure. In this way, the electronic device 100 can implement large-screen display, thereby improving viewing experience of the user.

In this embodiment, the flexible display 6 is fastened to the first housing 1, the flexible connecting piece 2, and the second housing 3. Because the flexible display 6 needs to be flattened and folded, the flexible connecting piece 2 is used to make the first housing 1 and the second housing 3 flattened and folded relative to each other. The flexible connecting piece 2 has a simple structure. Compared with a hinged-type rotating shaft, the flexible connecting piece 2 has a smaller size and is more compact, making the electronic device 100 become lighter and thinner.

As shown in FIG. 3, when the electronic device 100 is in the third physical form, the third housing 5 is located between the first housing 1 and the second housing 3, and a bending radius of the flexible connecting piece 2 between the first housing 1 and the second housing 3 is relatively large, so that a bending radius of a bent part that is of the flexible display 6 and that is fastened to the flexible connecting piece 2 is relatively large. In this way, the bent part of the flexible display 6 is more easily bent and expanded along with the flexible connecting piece 2 and is not prone to cause folds when being expanded.

In some embodiments, the flexible display 6 may be an organic light-emitting diode (organic light-emitting diode, OLED) display, an active-matrix organic light-emitting diode (active-matrix organic light-emitting diode, AMOLED) display, a mini light-emitting diode (mini organic light-emitting diode) display, a micro light-emitting diode (micro organic light-emitting diode) display, a micro organic light-emitting diode (micro organic light-emitting diode) display, a quantum dot light-emitting diode (quantum dot light emitting diodes, QLED) display, or the like. This is not strictly limited in this application.

In some embodiments, the flexible display 6 may be a touch display, so that a display function and a touch function are integrated.

In some embodiments, the flexible display 6 may include a display layer and a support layer. The support layer is located on a non-light-emitting side of the display layer. The support layer is made of a material with specific rigidity, such as an elastic metal material. The support layer is configured to support the display layer, so that the flexible display 6 has specific strength and flatness. This mitigates a risk of collapse or inward sinking of the flexible display 6 caused when the flexible display 6 is subject to external force (for example, a pressing operation or a touch operation performed by the user on the flexible display 6), thereby improving reliability of the flexible display 6, and prolonging a service life of the flexible display 6.

In some embodiments, as shown in FIG. 1 and FIG. 2, the electronic device 100 may further include a keypad assembly 7, and the keypad assembly 7 is fastened to the third housing 5. When the electronic device 100 is in the first physical form, an orientation of the keypad assembly 7 is the same as an orientation of the flexible display 6. In other words, the keypad assembly 7 and the flexible display 6 are located on one side of the electronic device 100. Because the rotating shaft 4 is connected between the second housing 3 and the third housing 5, and the rotating shaft 4 can implement free angle adjustment and keep stable, when the electronic device 100 is in the second physical form, the keypad assembly 7 and the flexible display 6 can be expanded at different angles depending on a user requirement, to satisfy input and viewing requirements of the user, and provide high comfort.

In some embodiments, the keypad assembly 7 may include a plurality of keys. A key spacing (which refers to a distance between centers of two keys) between the plurality of keys is greater than 15 mm (millimeters). For example, the keypad assembly 7 may be a full-size keypad, and a key spacing of the keypad assembly 7 may be in a range of 19 mm±1 mm. In this way, the keypad assembly 7 can satisfy input habits of most users, and help to improve use experience of the users. In some other embodiments, a touch layer may further be disposed on surfaces of the plurality of keys of the keypad assembly 7. In this case, a mechanical key input mode and a touch input mode are integrated into the keypad assembly 7. The user may implement input by pressing the plurality of keys, or may implement input by performing a touch operation, a tapping operation, a pressing operation, a sliding operation, or the like on the touch layer.

In some embodiments, as shown in FIG. 1, the electronic device 100 may further include a camera module 8. The camera module 8 is installed in the first housing 1 and is located below the flexible display 6. The camera module 8 is an under-display camera, and a photographing direction of the camera module 8 is the same as a display direction of the flexible display 6. When the camera module 8 performs photographing, light is allowed to pass through a region that is on the flexible display 6 and that faces a lens of the camera module 8, so that the camera module 8 can collect external light passing through the flexible display 6, to implement photographing. In some other embodiments, the photographing direction of the camera module 8 may be opposite to the display direction of the flexible display 6, that is, a light inlet side of the camera module 8 faces away from the flexible display 6.

In some other embodiments, the electronic device 100 may further include one or more of a facial recognition module (for example, a 3D structured light photographing module), an iris recognition module, an optical proximity sensor, and an ambient light sensor. The facial recognition module is configured to capture a face image of the user. The iris recognition module is configured to capture an iris image of the user. The optical proximity sensor is configured to determine, through sensing, whether an object is approaching. The ambient light sensor is configured to sense intensity of light in an ambient environment. The foregoing modules may be installed in the first housing 1.

In some embodiments, as shown in FIG. 1, the electronic device 100 may further include a fingerprint recognition module 9. The fingerprint recognition module 9 is installed in the second housing 3 and is located below the flexible display 6. For example, the fingerprint recognition module 9 may be located on a side that is of the second housing 3 and that is close to the third housing 5, so that the user can more easily touch a touch region corresponding to the fingerprint recognition module 9, thereby improving use experience of the user. A sensor that is in the fingerprint recognition module 9 and that is configured to detect a fingerprint pattern of the user may be a pressure sensor, a capacitive sensor, a resistive sensor, a temperature sensor, an optical sensor, or the like.

In some embodiments, as shown in FIG. 1, the electronic device 100 may further include a circuit board 10. The circuit board 10 may be installed in the third housing 5. The electronic device 100 may further include a processor (not shown in the figure) and a memory (not shown in the figure). The processor and the memory are fastened to the circuit board 10. The flexible display 6, the keypad assembly 7, the camera module 8, the fingerprint recognition module 9, and the like are coupled to the processor. The memory is configured to store computer program code. The computer program code includes computer instructions. The processor is configured to invoke the computer instructions to enable the electronic device 100 to perform corresponding operations, for example, enable the flexible display 6 to display a target image, and enable the fingerprint recognition module 9 to capture a fingerprint image of the user.

In some embodiments, as shown in FIG. 1, the electronic device 100 may further include a loudspeaker 20 and a microphone 30. The loudspeaker 20 may be installed in the third housing 5. One or more loudspeaker holes 51 are disposed in a region that is on a side face of the third housing 5 and that is close to the loudspeaker 20, and sound generated by the loudspeaker 20 is propagated to the outside of the electronic device 100 through the loudspeaker hole 51. The microphone 30 may be installed in the third housing 5. One or more microphone holes 52 are disposed in a region that is on the side face of the third housing 5 and that is close to the microphone 30, and external sound may be transferred into the electronic device 100 through the microphone hole 52, to be received by the microphone 30. The loudspeaker 20 and the microphone 30 are coupled to the processor.

In some embodiments, as shown in FIG. 1, the electronic device 100 may further include a battery 40. The battery 40 is installed in the third housing 5. The battery 40 is connected to the circuit board 10. The battery 40 is configured to supply power to an electrical component of the electronic device 100. The loudspeaker 20, the microphone 30, the circuit board 10, and the battery 40 may be laid flat inside the third housing 5, to help to reduce a thickness of the third housing 5, thereby making the electronic device 100 become lighter and thinner. In this application, that two components are laid flat means that the two components do not overlap.

In some other embodiments, components such as the camera module 8, the fingerprint recognition module 9, the circuit board 10, the loudspeaker 20, the microphone 30, and the battery 40 may alternatively be installed at other positions in the electronic device 100. This is not strictly limited in this application. In some other embodiments, the electronic device 100 may further include modules such as a motor, a sensor component, and an electrical connector assembly. This is not strictly limited in this application.

Figure 4:
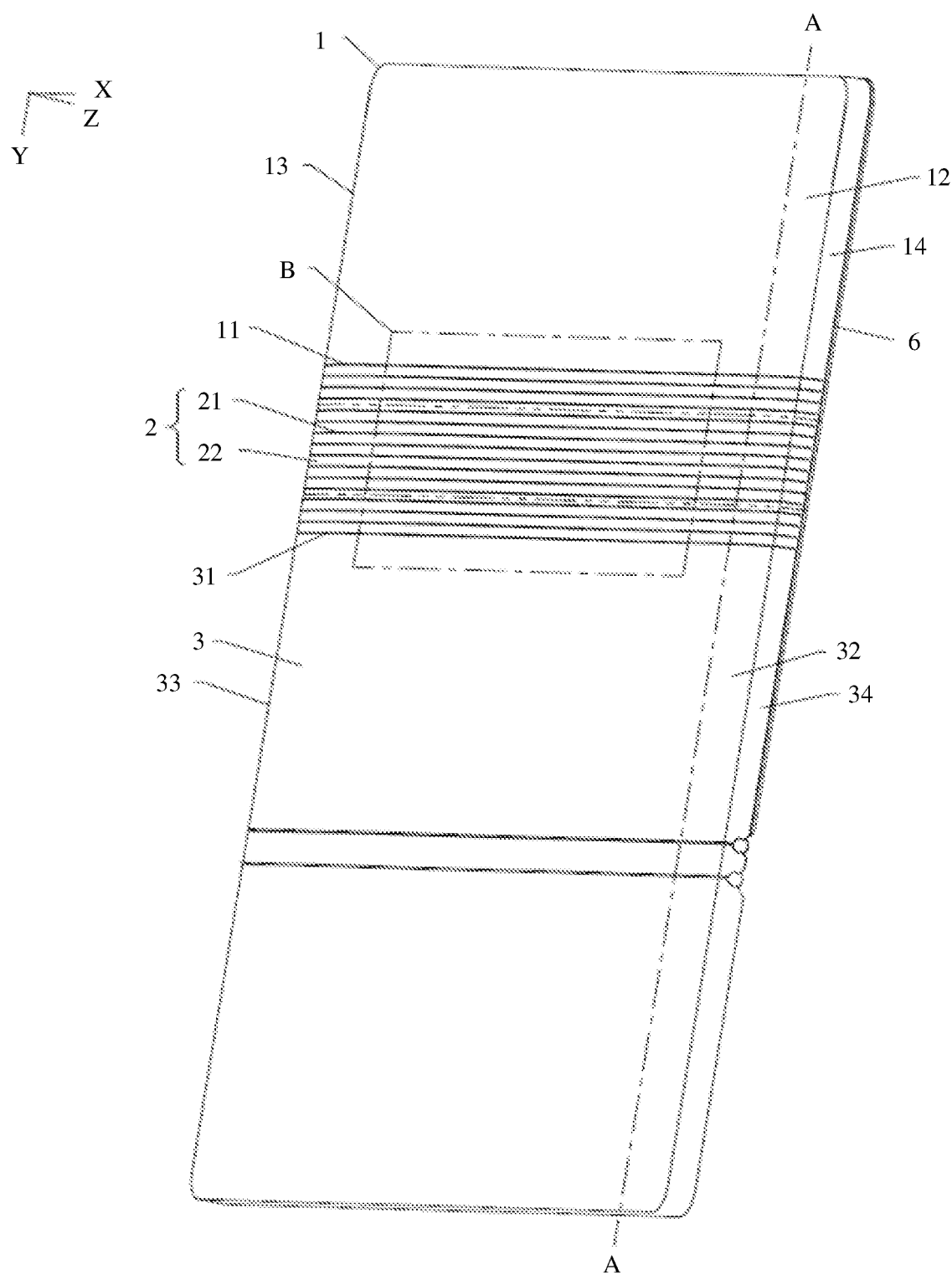
FIG. 4 is a schematic structural diagram that is of the electronic device shown in FIG. 1 and that is presented at another angle.

Referring to FIG. 3 and FIG. 4, FIG. 4 is a schematic structural diagram that is of the electronic device 100 shown in FIG. 1 and that is presented at another angle. The electronic device 100 shown in FIG. 4 is in the first physical form.

A plurality of first slits 11 are disposed on a side that is of the first housing 1 and that faces away from the flexible display 6. The plurality of first slits 11 are located in a region that is in the first housing 1 and that is close to the flexible connecting piece 2. A plurality of second slits 31 are disposed on a side that is of the second housing 3 and that faces away from the flexible display 6. The plurality of second slits 31 are located in a region that is in the second housing 3 and that is close to the flexible connecting piece 2. A plurality of third slits 21 are disposed on a side that is of the flexible connecting piece 2 and that faces away from the flexible display 6, and a convex part 22 is formed between two adjacent third slits 21. Extension directions of the first slit 11, the second slit 31, and the third slit 21 are parallel to the first direction X. The first slit 11, the second slit 31, and the third slit 21 are parallel to each other.

As shown in FIG. 3, when the first housing 1 and the second housing 3 are folded relative to each other, the flexible display 6 is folded and is located inside the first housing 1, the flexible connecting piece 2, and the second housing 3, and a plurality of convex parts 22 of the flexible connecting piece 2 are opened from each other by using the plurality of third slits 21. As shown in FIG. 4, when the first housing 1 and the second housing 3 are flattened relative to each other, the flexible display 6 is flattened, the plurality of convex parts 22 of the flexible connecting piece 2 are closed to each other, the plurality of first slits 11, the plurality of third slits 21, and the plurality of second slits 31 are arranged in the second direction Y, and the second direction Y is parallel to the first direction X.

In this embodiment, the flexible connecting piece 2 is provided with the plurality of third slits 21, so that the plurality of convex parts 22 can be opened from each other and closed to each other to flatten and bend the flexible connecting piece 2. In this case, the first housing 1 and the second housing 3 can be folded and flattened relative to each other. Because the first slits 11, the third slits 21, and the second slits 31 are parallel to each other and are sequentially arranged, the first slits 11, the third slits 21, and the second slits 31 can jointly form an appearance texture of the electronic device 100, and the texture is regular and beautiful. Because the third slits 21 can be naturally fused to the appearance texture of the electronic device 100 to implement concealment, the electronic device 100 has relatively high appearance consistency. In addition, in a process in which the first housing 1 and the second housing 3 rotate relative to each other by using the flexible connecting piece 2, the appearance texture of the electronic device 100 can naturally change. This is conducive to improving user experience.

Figure 5:
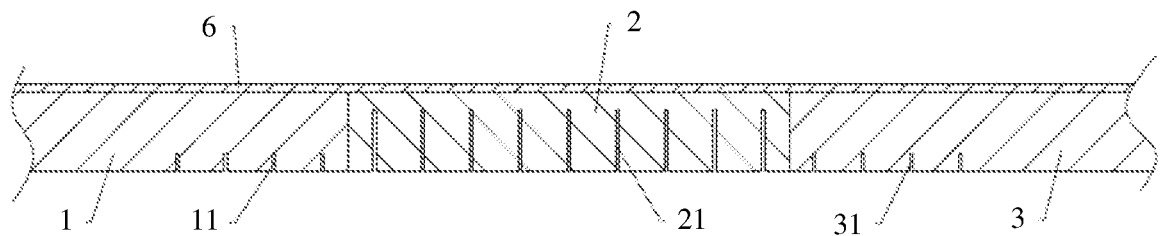
FIG. 5 is a schematic cross-sectional diagram of a part of a structure that is of the electronic device shown in FIG. 4 and that is obtained by cutting along a line A-A.

FIG. 5 is a schematic cross-sectional diagram of a part of a structure that is of the electronic device 100 shown in FIG. 4 and that is obtained by cutting along a line A-A. In some embodiments, a depth of the third slit 21 is greater than a depth of the first slit 11 and a depth of the second slit 31. In this embodiment, the depth of the third slit 21 is relatively large, to satisfy a bending requirement of the flexible connecting piece 2. The depth of the first slit 11 and the depth of the second slit 31 are relatively small, so that not only a partial texture of the appearance of the electronic device 100 can be formed, but also a footprint of the first slit 11 on the first housing 1 and a footprint of the second slit 31 on the second housing 3 can be reduced. In this case, in the first housing 1 and the second housing 3, there is more space for arranging other components, without significantly reducing structural strength of the first housing 1 and the second housing 3. Therefore, the electronic device 100 has relatively high reliability.

In some embodiments, the depth of the first slit 11 may be the same as the depth of the second slit 31. In some other embodiments, the depth of the first slit 11 may be different from the depth of the second slit 31.

In some embodiments, as shown in FIG. 4, the first housing 1 includes a back face 12 and two side faces (13 and 14) respectively connected to two sides of the back face 12, and the first slit 11 extends from the side face 13 to the side face 14 through the back face 12. The second housing 3 includes a back face 32 and two side faces (33 and 34) respectively connected to two sides of the back face 32, and the second slit 31 extends from the side face 33 to the side face 34 through the back face 32.

In this embodiment, the first slit 11 extends to the side faces (13 and 14) of the first housing 1, and the second slit 31 extends to the side faces (33 and 34) of the second housing 3. Therefore, from a side view of the electronic device 100, appearance of the third slit 21 on the flexible connecting piece 2 is also similar to appearance of the first slit 11 and the second slit 31. Therefore, the third slit 21 can be well fused to the appearance texture of the electronic device 100.

In some embodiments, as shown in FIG. 4, the plurality of first slits 11, the plurality of third slits 21, and the plurality of second slits 31 are arranged at equal intervals. The plurality of third slits 21 are arranged at equal intervals, so that force exerted on the flexible connecting piece 2 when the flexible connecting piece 2 is being bent and expanded is more uniform, and the flexible connecting piece 2 has higher reliability and a longer service life. When the electronic device 100 is in the first physical form and the second physical form, the plurality of first slits 11, the plurality of third slits 21, and the plurality of second slits 31 are arranged at equal intervals, so that the third slits 21 can be better coupled to the first slits 11 and the second slits 31 visually, and the electronic device 100 has higher appearance consistency.

In some other embodiments, the plurality of third slits 21 are arranged at equal intervals, and arrangement density of the plurality of first slits 11 and the plurality of second slits 31 gradually changes. In some examples, in a direction in which the plurality of first slits 11 and the plurality of second slits 31 are close to the plurality of third slits 21, the arrangement density of the plurality of first slits 11 progressively increases, and the arrangement density of the plurality of second slits 31 progressively increases. In this way, not only the third slits 21 can be fused to the appearance of the electronic device 100, but also a quantity of first slits 11 on the first housing 1 and a quantity of second slits 31 on the second housing 3 can be reduced, so that the first housing 1 and the second housing 3 have higher structural strength. In some other examples, in the direction in which the plurality of first slits 11 and the plurality of second slits 31 are close to the plurality of third slits 21, the arrangement density of the plurality of first slits 11 progressively decreases, and the arrangement density of the plurality of second slits 31 progressively decreases. In still some other examples, the plurality of first slits 11 and the plurality of second slits 31 may alternatively be arranged in another manner such as random arrangement, so that the appearance of the electronic device 100 is more diversified.

In some embodiments, the first housing 1 and the second housing 3 each include a substrate and a flexible cladding layer, and an outer side of the substrate is coated with the flexible cladding layer. The first housing 1 and the second housing 3 may be fabricated by using an injection molding process. A material of the flexible cladding layer may be but is not limited to silica gel, leather, or microfiber. A first gap may be formed at the flexible cladding layer of the first housing 1. A second gap may be formed at the flexible cladding layer of the second housing 3. In some embodiments, the third housing 5 may also use a structure formed by coating the substrate with the flexible cladding layer, so that the electronic device 100 has high appearance consistency.

It can be understood that the electronic device 100 shown in FIG. 4 presents an example texture structure. The electronic device 100 in this embodiment of this application may alternatively use another texture structure.

Figure 6:
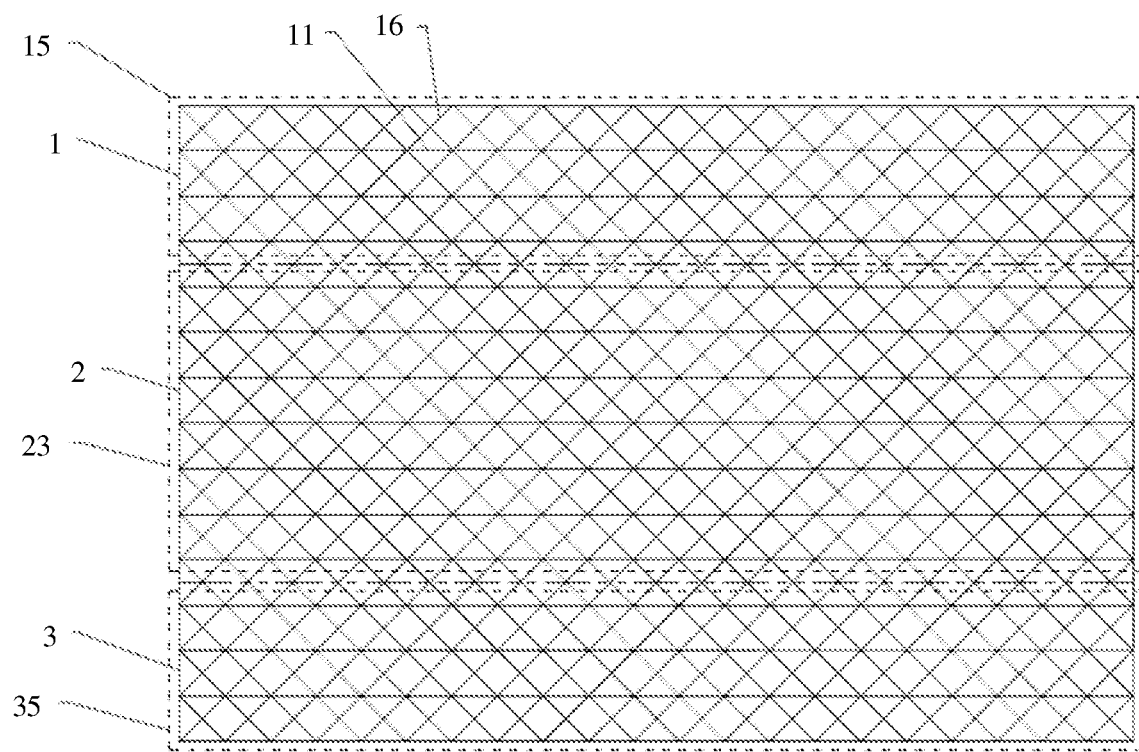
FIG. 6 is a schematic diagram of a texture of the electronic device shown in FIG. 4 according to some other embodiments.
Figure 7:
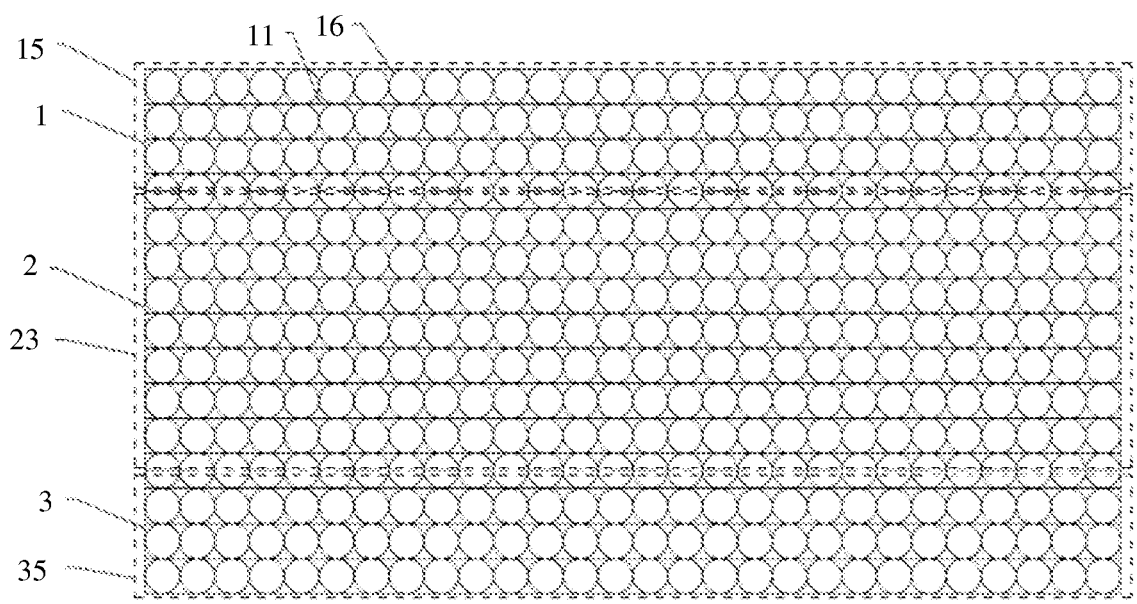
FIG. 7 is a schematic diagram of a texture of the electronic device shown in FIG. 4 according to still some other embodiments.

FIG. 6 is a schematic diagram of a texture of the electronic device 100 shown in FIG. 4 according to some other embodiments. FIG. 7 is a schematic diagram of a texture of the electronic device 100 shown in FIG. 4 according to still some other embodiments.

A first slit pattern 15 is formed on the side that is of the first housing 1 and that faces away from the flexible display 6. The first slit pattern 15 may include the first slit 11 and a fourth slit 16. The fourth slit 16 intersects with or is parallel to the first slit 11. The fourth slit 16 may be a straight line or a curve. The first slit pattern 15 may further include other slits, and details are not described herein.

A second slit pattern 35 is formed on the side that is of the second housing 3 and that faces away from the flexible display 6. A third slit pattern 23 is formed on the side that is of the flexible connecting piece 2 and that faces away from the flexible display 6. The third slit pattern 23 is the same as the second slit pattern 35 and the first slit pattern 15.

In this embodiment, the third slit pattern 23 on the flexible connecting piece 2 can be well fused with the first slit pattern 15 of the first housing 1 and the second slit pattern 35 of the second housing 3, so that the electronic device 100 has higher appearance consistency.

In some embodiments of this application, the electronic device 100 further includes a limiting structure, and the limiting structure is configured to assist the first housing 1 and the second housing 3 in keeping flattened relative to each other. The limiting structure can assist the first housing 1 and the second housing 3 in keeping a relatively stable relative position relationship when the first housing 1 and the second housing 3 are flattened relative to each other. Therefore, the flexible display 6 can keep in a stable large-screen display state when the electronic device 100 is in the first physical form and the second physical form, thereby improving reliability of the electronic device 100.

There may be a plurality of implementations of the limiting structure. The following provides descriptions by using examples.

Figure 8:
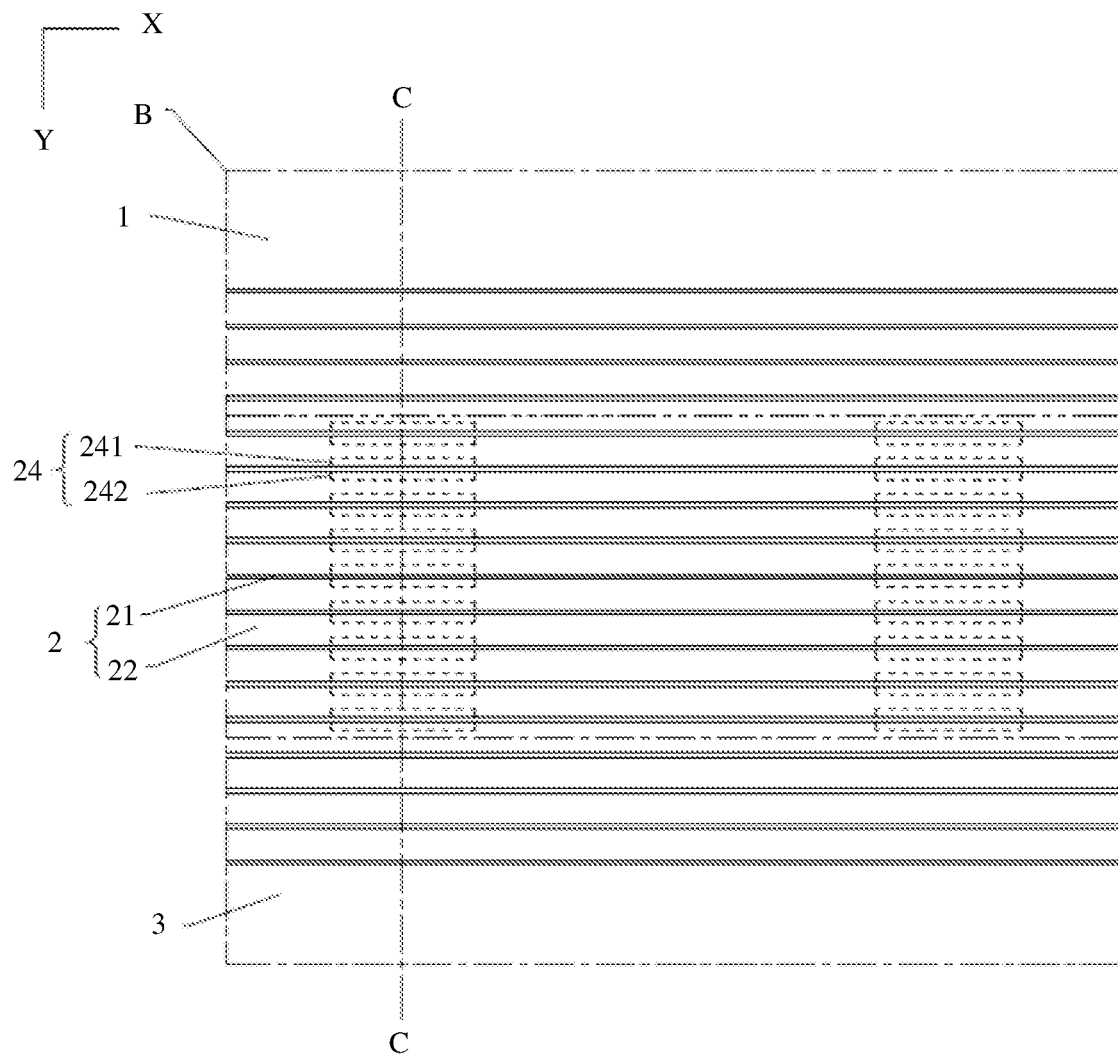
FIG. 8 is a schematic structural diagram of a structure that is of the electronic device shown in FIG. 4 and that is at a position B according to some embodiments.
Figure 9:
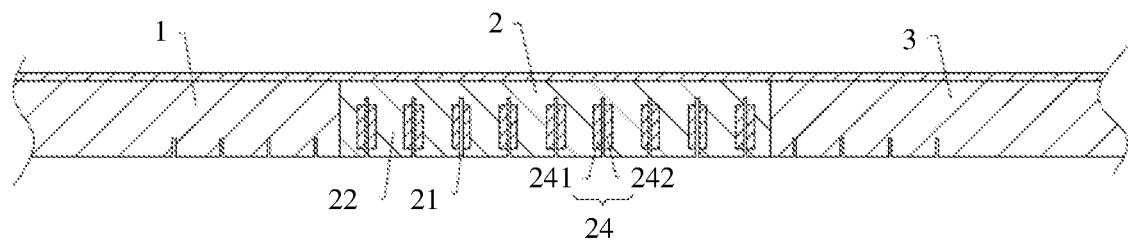
FIG. 9 is a schematic diagram of a cross section that is obtained by cutting the structure shown in FIG. 8 along a line C-C.
Figure 10:
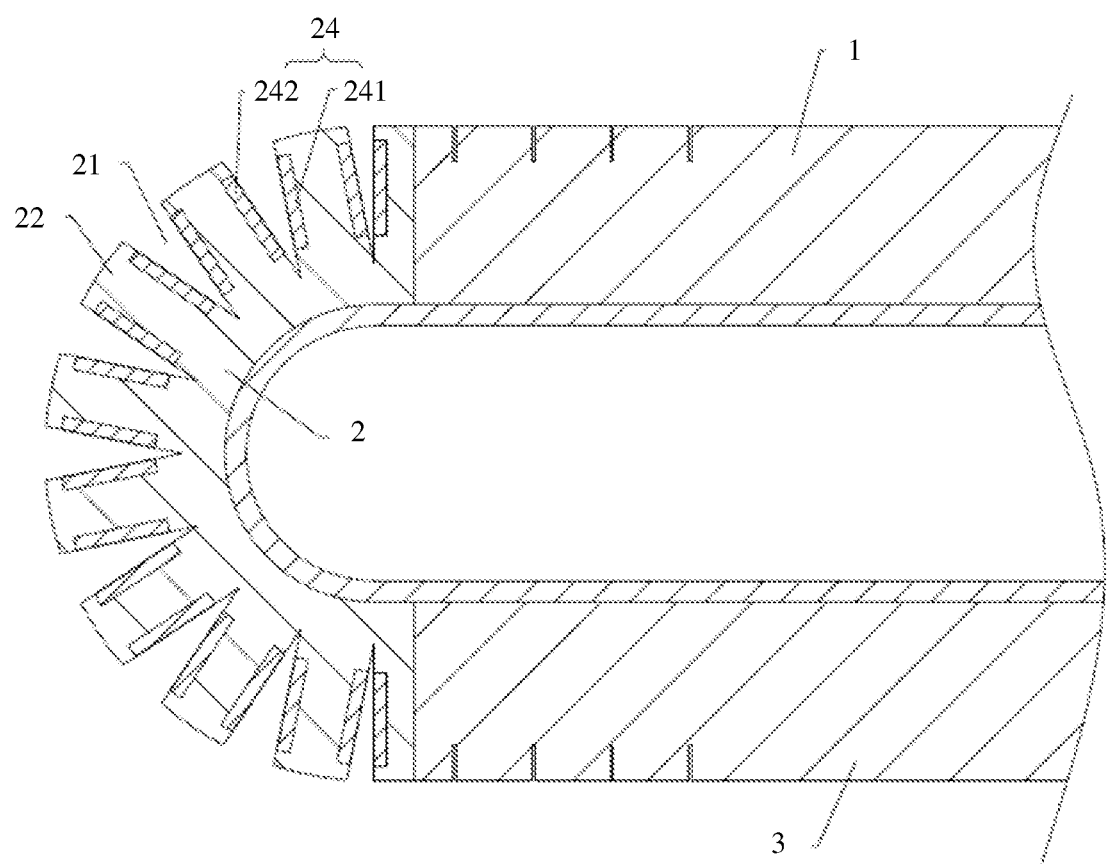
FIG. 10 is a schematic diagram of a structure obtained after the structure shown in FIG. 9 is folded.

FIG. 8 is a schematic structural diagram of a structure that is of the electronic device 100 shown in FIG. 4 and that is at a position B according to some embodiments. FIG. 9 is a schematic diagram of a cross section that is obtained by cutting the structure shown in FIG. 8 along a line C-C. FIG. 10 is a schematic diagram of a structure obtained after the structure shown in FIG. 9 is folded.

As shown in FIG. 8, the electronic device 100 further includes a plurality of magnetic attachment assemblies 24. At least one magnetic attachment assembly 24 is correspondingly disposed in each third slit 21. For example, in the embodiment described in FIG. 8, two magnetic attachment assemblies 24 are correspondingly disposed in each third slit 21. In some other embodiments, alternatively, one or at least three (including three) magnetic attachment assemblies 24 may be correspondingly disposed in each third slit 21. In the embodiment described in FIG. 8, quantities of magnetic attachment assemblies 24 correspondingly disposed in all the third slits 21 are the same, and magnetic attachment assemblies 24 corresponding to different third slits 21 are arranged in the second direction Y in an aligned manner. In some other embodiments, the quantities of magnetic attachment assemblies 24 correspondingly disposed in all the third slits 21 are the same, and magnetic attachment assemblies 24 corresponding to different third slits 21 are arranged in the second direction Y in a staggered manner. In some other embodiments, quantities of magnetic attachment assemblies 24 corresponding to different third slits 21 may be identical or different.

As shown in FIG. 8 and FIG. 9, each magnetic attachment assembly 24 includes a first magnetic attachment member 241 and a second magnetic attachment member 242 that are attached to each other. The first magnetic attachment member 241 and the second magnetic attachment member 242 are respectively disposed in two convex parts 22 located on two sides of the third slit 21, and the first magnetic attachment member 241 and the second magnetic attachment member 242 are disposed opposite to each other. The first magnetic attachment member 241 and the second magnetic attachment member 242 may be magnets with different polarities. Alternatively, one of the magnetic attachment members may be a magnet and the other may be made of a ferromagnetic material.

As shown in FIG. 8, when the first housing 1 and the second housing 3 are flattened relative to each other, a plurality of convex parts 22 of the flexible connecting piece 2 are closed to each other, a first magnetic attachment member 241 and a second magnetic attachment member 242 in one magnetic attachment assembly 24 are close to each other, and magnetic attachment force is generated between the two magnetic attachment members, so that all the plurality of convex parts 22 of the flexible connecting piece 2 keep in stable states, and the first housing 1 and the second housing 3 keep flattened relative to each other. In this embodiment, the plurality of magnetic attachment assemblies 24 are disposed, so that the first housing 1 and the second housing 3 can keep flattened relative to each other. The plurality of magnetic attachment assemblies 24 have simple structures and small sizes, making the flexible connecting piece 2 become lighter and thinner. In addition, an implementation of keeping, by using the plurality of magnetic attachment assemblies 24, the first housing 1 and the second housing 3 flattened relative to each other is simple and highly reliable.

As shown in FIG. 9, when the first housing 1 and the second housing 3 are folded relative to each other, the plurality of convex parts 22 of the flexible connecting piece 2 are away from each other, a first magnetic attachment member 241 and a second magnetic attachment member 242 in one magnetic attachment assembly 24 are away from each other, and magnetic attachment force between the two magnetic attachment members is reduced. In this case, the electronic device 100 may be provided with a fixing structure, so that the first housing 1 and the second housing 3 better keep folded relative to each other.

Figure 11:
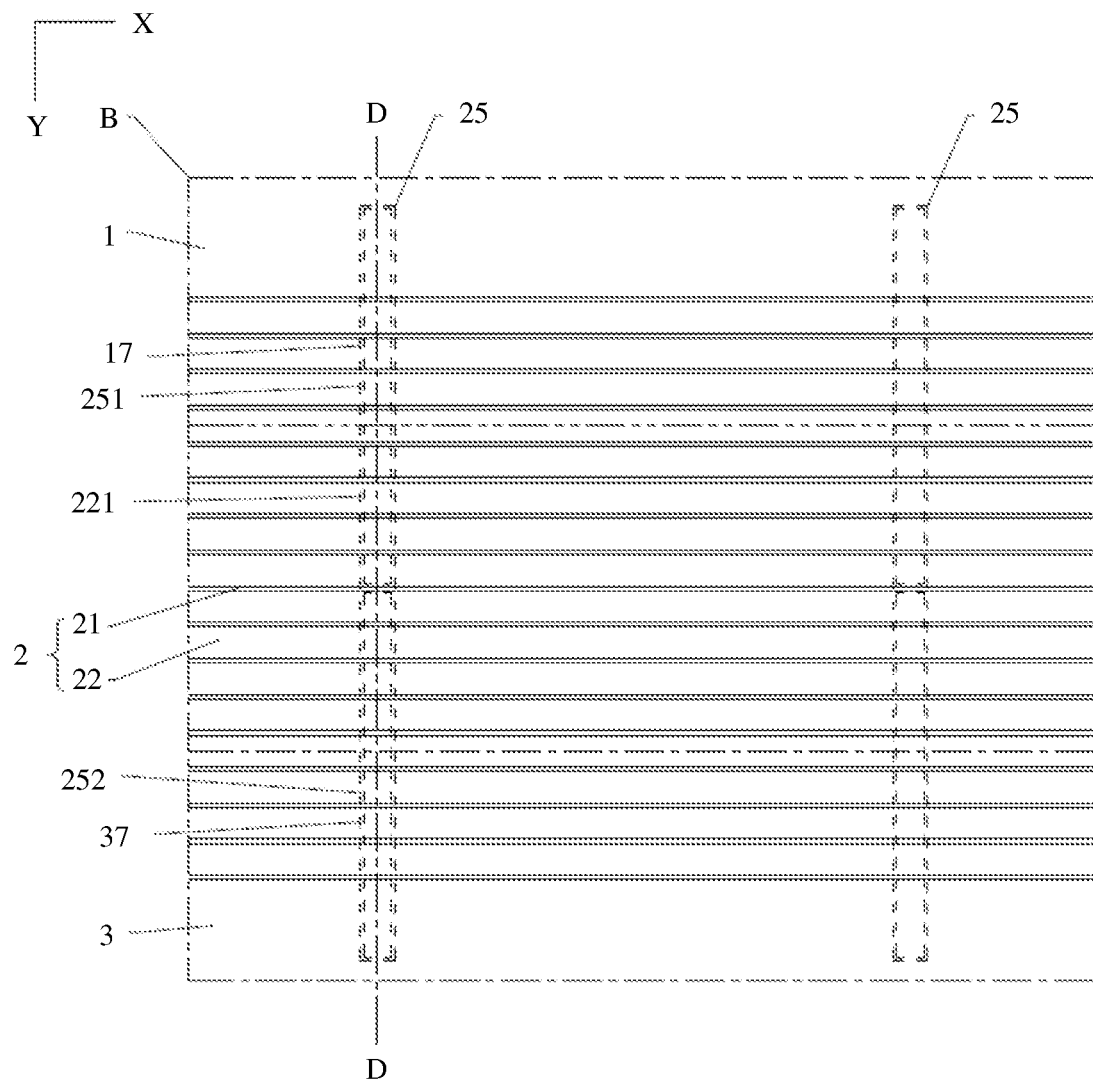
FIG. 11 is a schematic structural diagram of a structure that is of the electronic device shown in FIG. 4 and that is at a position B according to some other embodiments.
Figure 12A:
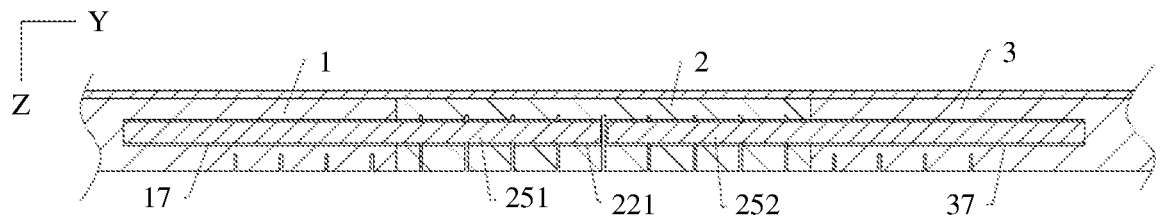
FIG. 12A is a schematic diagram of a cross section that is obtained by cutting the structure shown in FIG. 11 along a line D-D.
Figure 12B:
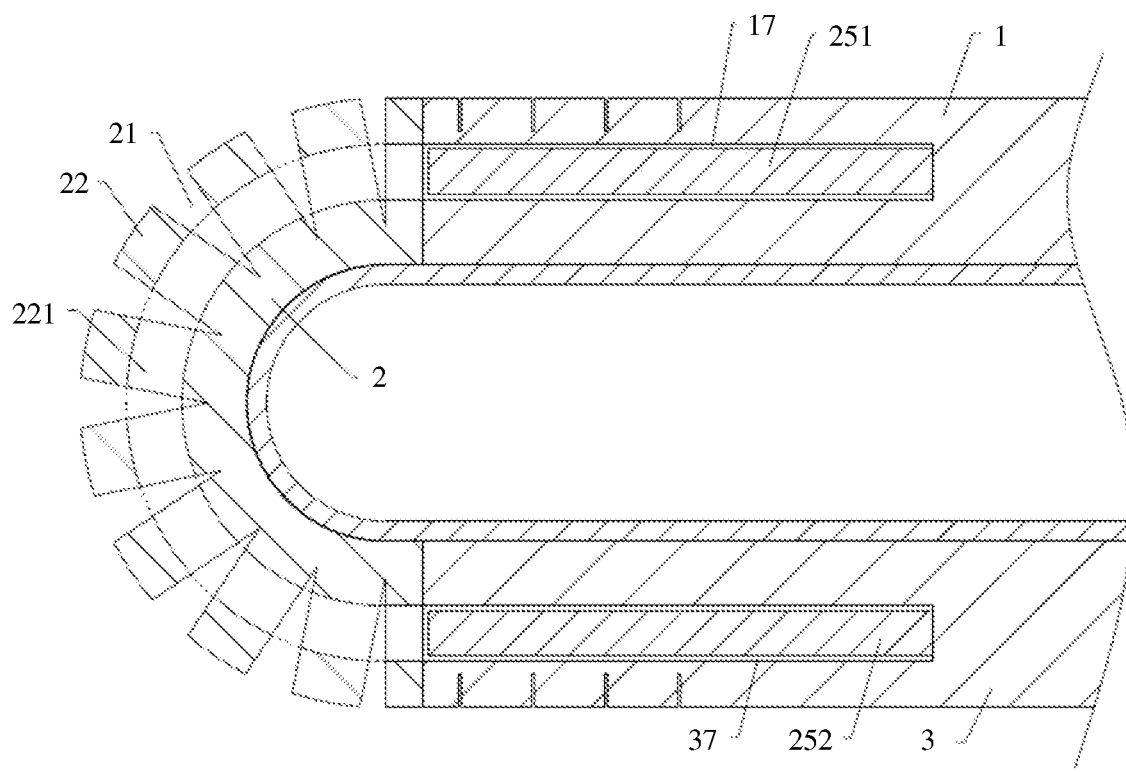
FIG. 12B is a schematic diagram of a structure obtained after the structure shown in FIG. 12A is folded.

FIG. 11 is a schematic structural diagram of a structure that is of the electronic device 100 shown in FIG. 4 and that is at a position B according to some other embodiments. FIG. 12A is a schematic diagram of a cross section that is obtained by cutting the structure shown in FIG. 11 along a line D-D. FIG. 12B is a schematic diagram of a structure obtained after the structure shown in FIG. 12A is folded.

The first housing 1 forms a first channel 17, the second housing 3 forms a second channel 37, the plurality of convex palls 22 of the flexible connecting piece 2 form a third channel 221, the third channel 221 crosses the plurality of third slits 21, and the third channel 221 is connected to the first channel 17 and the second channel 37. The first channel 17, the third channel 221, and the second channel 37 are sequentially connected and extend in the second direction Y. The first channel 17, the third channel 221, and the second channel 37 jointly form an activity channel 25. There may be one or more activity channels 25. For example, in the embodiment described in FIG. 11, there are two activity channels 25, and the two activity channels 25 are separated from each other in the first direction X. In some other embodiments, alternatively, there may be one or at least three activity channels 25.

The electronic device 100 further includes a first memory metal piece 251 and a second memory metal piece 252. The first memory metal piece 251 and the second memory metal piece 252 are located on the activity channel 25. The first memory metal piece 251 is made of a memory metal material. The first memory metal piece 251 is elongated when being powered on and heated, and restores to an initial length when being powered off. A quantity of first memory metal pieces 251 and a quantity of second memory metal pieces 252 are the same as a quantity of activity channels 25.

As shown in FIG. 12B, when the first housing 1 and the second housing 3 are folded relative to each other, the first memory metal piece 251 and the second memory metal piece 252 are powered off, the first memory metal piece 251 is located on the first channel 17, and the second memory metal piece 252 is located on the second channel 37. In this case, lengths of the first memory metal piece 251 and the second memory metal piece 252 are initial lengths and are relatively short, so that the first memory metal piece 251 can be accommodated in the first channel 17, and the second memory metal piece 252 can be accommodated in the second channel 37. This avoids interference on folding of the flexible connecting piece 2, thereby making the electronic device 100 more reliable.

As shown in FIG. 11 and FIG. 12A, when the first housing 1 and the second housing 3 are flattened relative to each other, the first memory metal piece 251 and the second memory metal piece 252 are powered on, the first memory metal piece 251 is heated and elongated, one end of the first memory metal piece 251 extends into the third channel 221, the second memory metal piece 252 is heated and elongated, and one end of the second memory metal piece 252 extends into the third channel 221. In this embodiment, based on a characteristic that the first memory metal piece 251 and the second memory metal piece 252 are elongated after being powered on and heated, the first memory metal piece 251 and the second memory metal piece 252 extend into the flexible connecting piece 2 to support the flexible connecting piece 2, so that the flexible connecting piece 2 keeps in a flattened state, and the first housing 1 and the second housing 3 keep flattened relative to each other.

In some embodiments, when the first housing 1 and the second housing 3 are flattened relative to each other, the first memory metal piece 251 and the second memory metal piece 252 are powered on, and abut each other after being heated and elongated. In this case, the first memory metal piece 251 and the second memory metal piece 252 support the flexible connecting piece 2 more fully. In some other embodiments, alternatively, after the first memory metal piece 251 and the second memory metal piece 252 are heated and elongated, there may still be a small gap between the first memory metal piece 251 and the second memory metal piece 252.

In some embodiments, the electronic device 100 may further include an angle detection module (for example, an acceleration sensor), and the angle detection module is configured to detect an angle between the first housing 1 and the third housing 3. The angle detection module may be installed in the flexible connecting piece 2 or at a position that is in the first housing 1 or/and the third housing 3 and that is close to the flexible connecting piece 2. When detecting, by using the angle detection module, that the angle between the first housing 1 and the third housing 3 falls within a threshold range, the processor of the electronic device 100 determines that the first housing 1 and the third housing 3 are flattened relative to each other. In this case, the processor controls the first memory metal piece 251 and the second memory metal piece 252 to be powered on. When detecting, by using the angle detection module, that the angle between the first housing 1 and the third housing 3 falls outside the threshold range, the processor determines that a state in which the first housing 1 and the third housing 3 are flattened relative to each other is terminated. In this case, the processor controls the first memory metal piece 251 and the second memory metal piece 252 to be powered off. Alternatively, when receiving a limit cancelation instruction (for example, the user performs a corresponding operation by using a touchscreen), the processor controls the first memory metal piece 251 and the second memory metal piece 252 to be powered off.

In some other embodiments, the electronic device 100 may further include a trigger key. The trigger key may be a physical key or a virtual key. If detecting that the trigger key is triggered by the user and that the first memory metal piece 251 and the second memory metal piece 252 are in a power-off state, the processor controls the first memory metal piece 251 and the second memory metal piece 252 to be powered on; and if detecting that the trigger key is triggered by the user and that the first memory metal piece 251 and the second memory metal piece 252 are in a power-on state, the processor controls the first memory metal piece 251 and the second memory metal piece 252 to be powered off.

In some embodiments, as shown in FIG. 12B, an end that is of the first memory metal piece 251 and that is away from the third channel 221 is fixedly connected to the first housing 1, so that when the first memory metal piece 251 is not heated or is not shortened, the first memory metal piece 251 can retract back to the first channel 17, to avoid interference on bending of the flexible connecting piece 2. An end that is of the second memory metal piece 252 and that is away from the third channel 221 is fixedly connected to the second housing 3, so that when the second memory metal piece 252 is not heated or is not shortened, the second memory metal piece 252 can retract back to the second channel 37, to avoid interference on the bending of the flexible connecting piece 2.

In some other embodiments, the electronic device 100 includes a memory metal piece. When the first housing 1 and the second housing 3 are folded relative to each other, the memory metal piece is powered off and is accommodated in the first channel 17 (or the second channel 37). When the first housing 1 and the second housing 3 are flattened relative to each other, the memory metal piece is powered on, heated, and elongated, and one end of the memory metal piece passes through the third channel 221 and extends into the second channel 37 (or the first channel 17). In this embodiment, there are a relatively small quantity of memory metal pieces, and a method for controlling the memory metal piece is simple. This is conducive to improving the reliability of the electronic device 100.

Figure 13A:
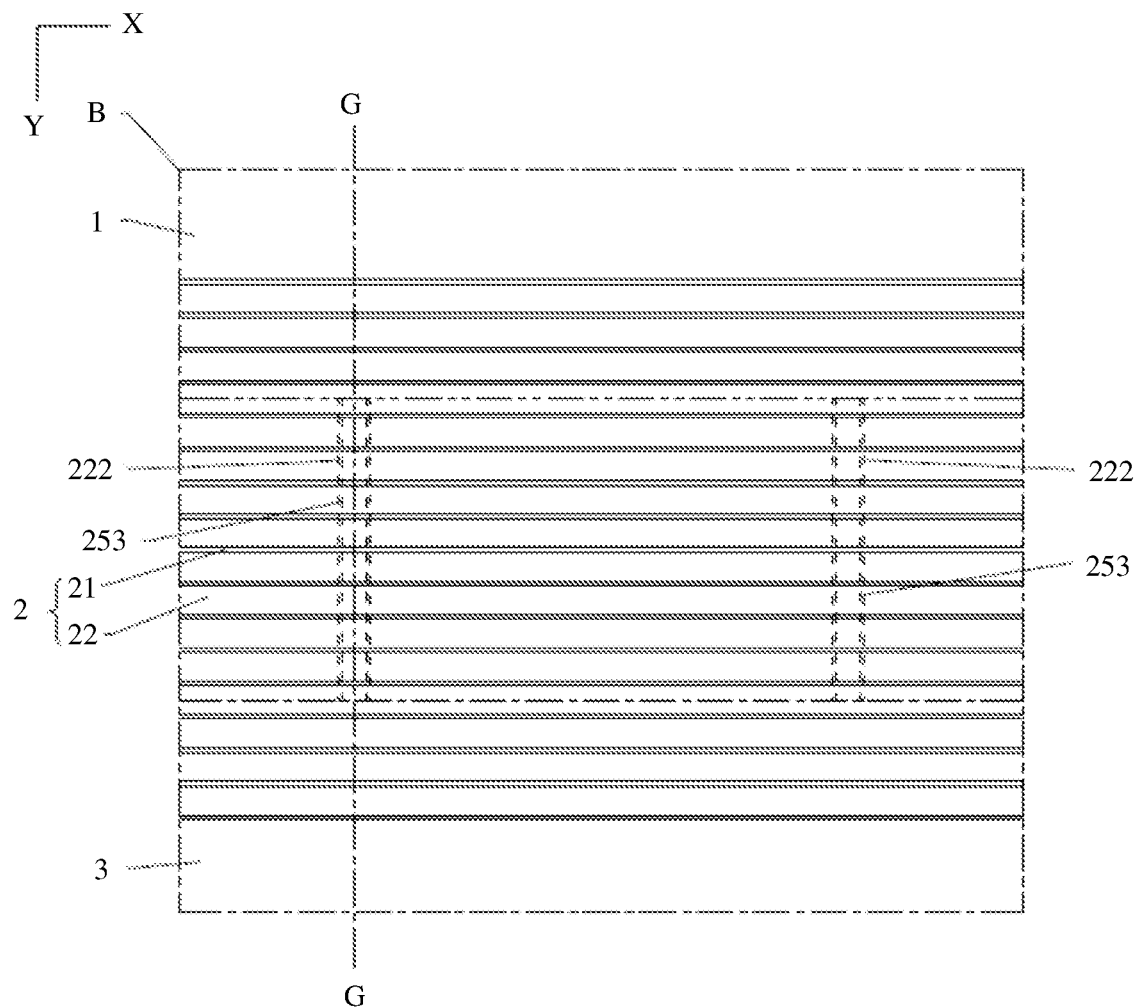
FIG. 13A is a schematic structural diagram of a structure that is of the electronic device shown in FIG. 4 and that is at a position B according to still some other embodiments.
Figure 13B:
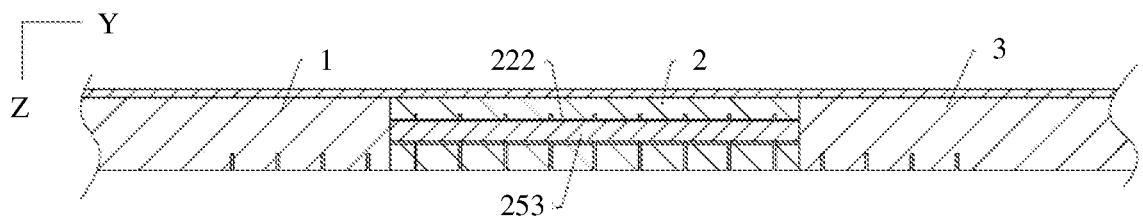
FIG. 13B is a schematic diagram of a cross section that is obtained by cutting the structure shown in FIG. 13A along a line G-G.
Figure 13C:
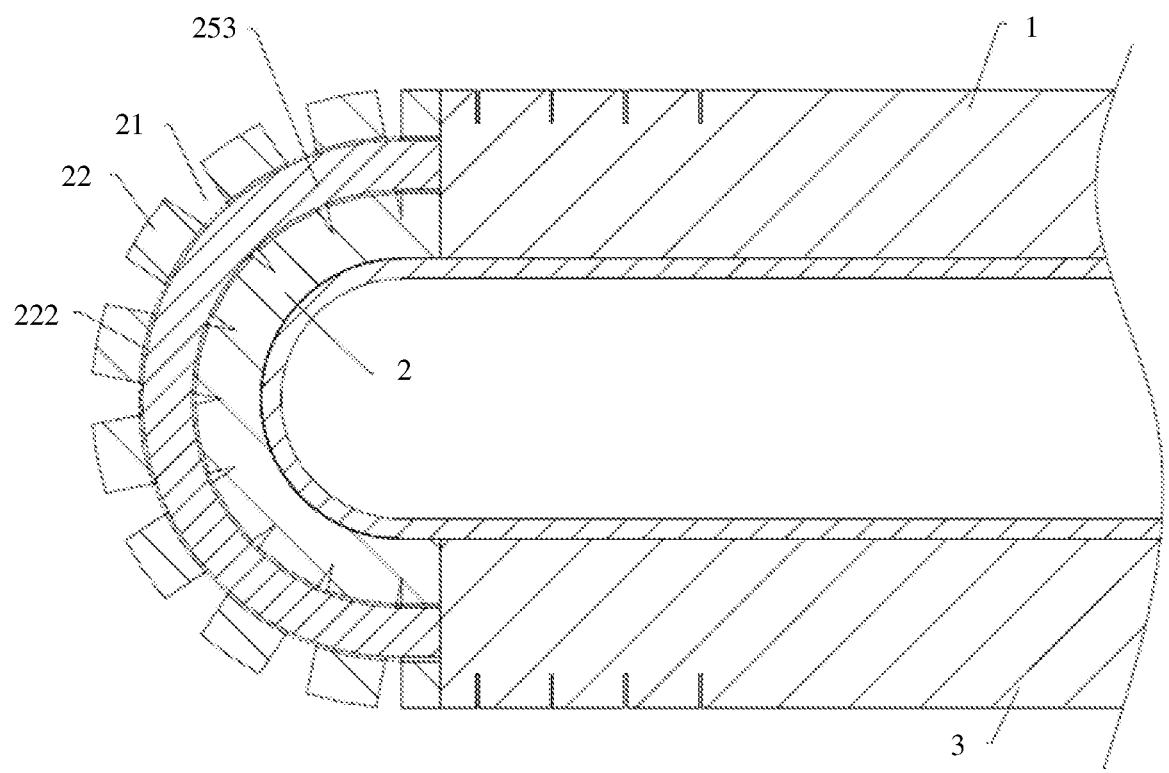
FIG. 13C is a schematic diagram of a structure obtained after the structure shown in FIG. 13B is folded.

FIG. 13A is a schematic structural diagram of a structure that is of the electronic device shown in FIG. 4 and that is at a position B according to still some other embodiments. FIG. 13B is a schematic diagram of a cross section that is obtained by cutting the structure shown in FIG. 13A along a line G-G. FIG. 13C is a schematic diagram of a structure obtained after the structure shown in FIG. 13B is folded.

In an embodiment, as shown in FIG. 13A, the plurality of convex parts 22 of the flexible connecting piece 2 form a deformation channel 222, and the deformation channel 222 crosses the plurality of third slits 21. The deformation channel 222 penetrates through the flexible connecting piece 2 in the second direction Y. There may be one or more deformation channels 222. For example, there are two deformation channels 222, and the two deformation channels 222 are separated from each other in the first direction X.

As shown in FIG. 13A, the electronic device 100 further includes a memory metal piece 253, and the memory metal piece 253 is accommodated in the deformation channel 222. One end of the memory metal piece 253 is fixedly connected to the first housing 1, and the other end of the memory metal piece 253 is fixedly connected to the second housing 3. In some embodiments, the two ends of the memory metal piece 253 may be respectively connected to an end face that is of the first housing 1 and that faces the flexible connecting piece 2 and an end face that is of the second housing 3 and that faces the flexible connecting piece 2. In some other embodiments, the two ends of the memory metal piece 253 may partially extend into the first housing 1 and the second housing 3 respectively. A quantity of memory metal pieces 253 is equal to a quantity of deformation channels 222, and the memory metal piece 253 and the deformation channel 222 are disposed in a one-to-one correspondence.

As shown in FIG. 13B, when the first housing 1 and the second housing 3 are flattened relative to each other, the memory metal piece 253 is shortened and flattened after being powered on and heated. After the memory metal piece 253 is powered off, the memory metal piece 253 keeps a relatively short length and in a flattened shape, where the flattened shape is an original shape of the memory metal piece 253.

As shown in FIG. 13C, when the first housing 1 and the second housing 3 are folded relative to each other, the memory metal piece 253 is elongated and bent along with the flexible connecting piece 2. In a process in which the first housing 1 and the second housing 3 are folded relative to each other, the first housing 1 and the second housing 3 respectively exert external force on the two ends of the memory metal piece 253, and the flexible connecting piece 2 exerts external force on the entire memory metal piece 253. Therefore, the memory metal piece 253 can be elongated, and varies with a shape of the flexible connecting piece 2.

In this embodiment, the memory metal piece 253 can be deformed along with the flexible connecting piece 2 under an action of external force, to support the flexible connecting piece 2 when the first housing 1 and the second housing 3 are folded relative to each other. The memory metal piece 253 can also be shortened and flattened after being powered on and heated, so that the flexible connecting piece 2 can keep flattened when the first housing 1 and the second housing 3 are flattened relative to each other.

In some embodiments, when detecting, by using the angle detection module (referring to the foregoing embodiment), that the angle between the first housing 1 and the third housing 3 falls within the threshold range, the processor of the electronic device 100 determines that the first housing 1 and the third housing 3 are expanded relative to each other. In this case, the processor controls the memory metal piece 253 to be powered on to make the memory metal piece 253 gradually restore to an original shape (that is, shortened and flattened), and then controls the memory metal piece 253 to be powered off.

In some other embodiments, if detecting that the trigger key (referring to the foregoing embodiment) is triggered by the user, the processor of the electronic device 100 controls the memory metal piece 253 to be powered on to make the memory metal piece 253 gradually restore to the original shape (that is, shortened and flattened), and then controls the memory metal piece 253 to be powered off.

Figure 14:
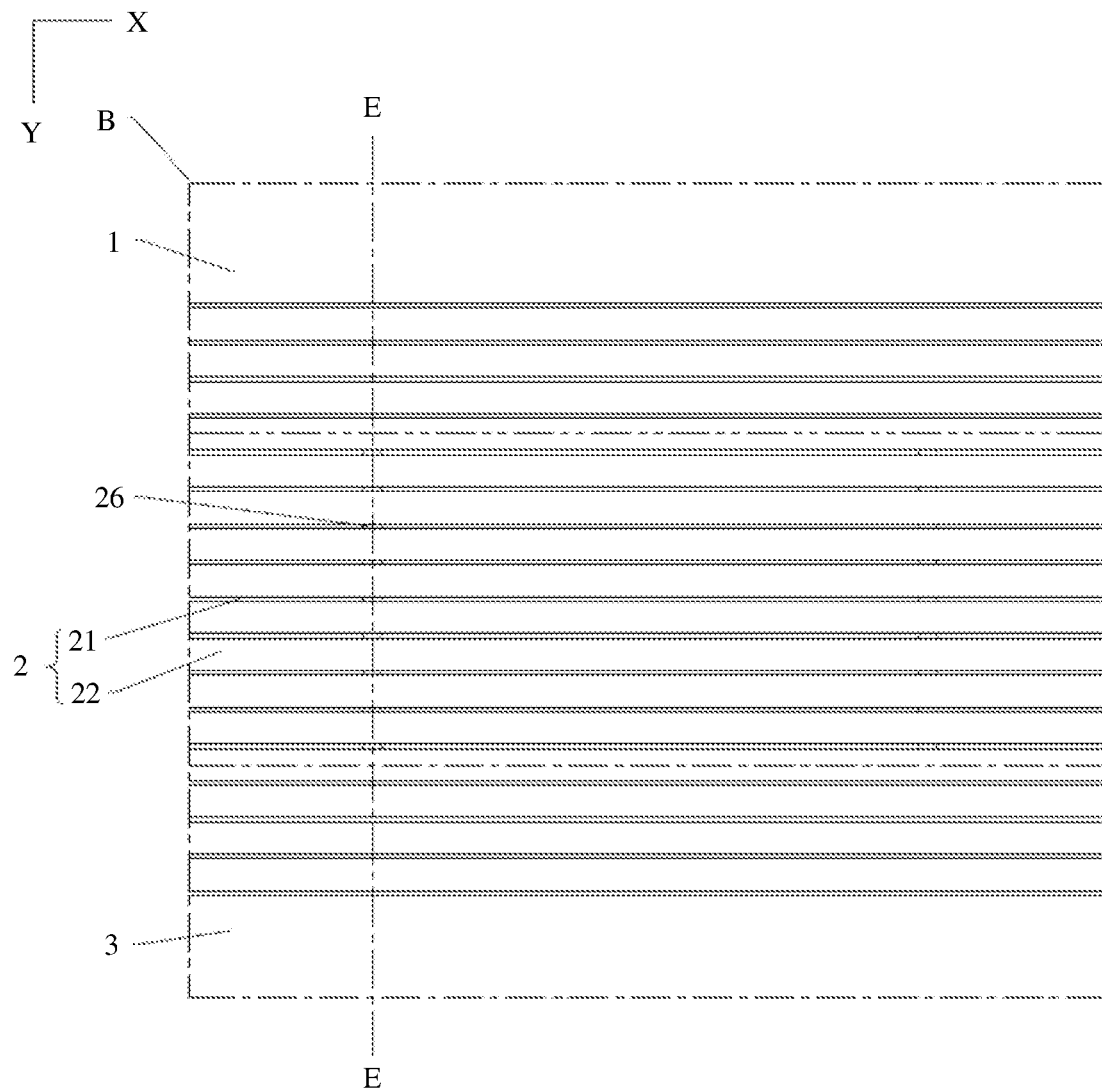
FIG. 14 is a schematic structural diagram of a structure that is of the electronic device shown in FIG. 4 and that is at a position B according to still some other embodiments.
Figure 15:
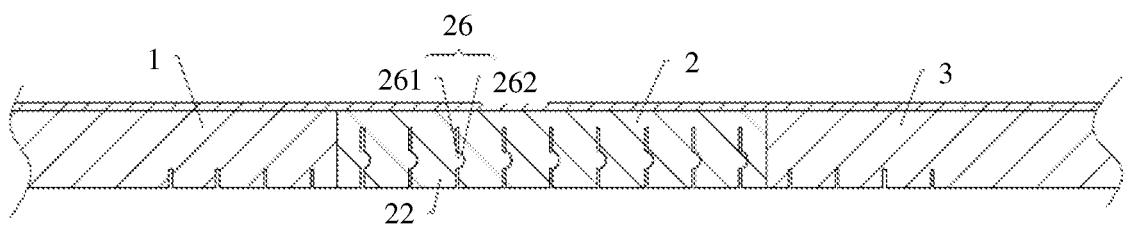
FIG. 15 is a schematic diagram of a cross section that is obtained by cutting the structure shown in FIG. 14 along a line E-E.
Figure 16:
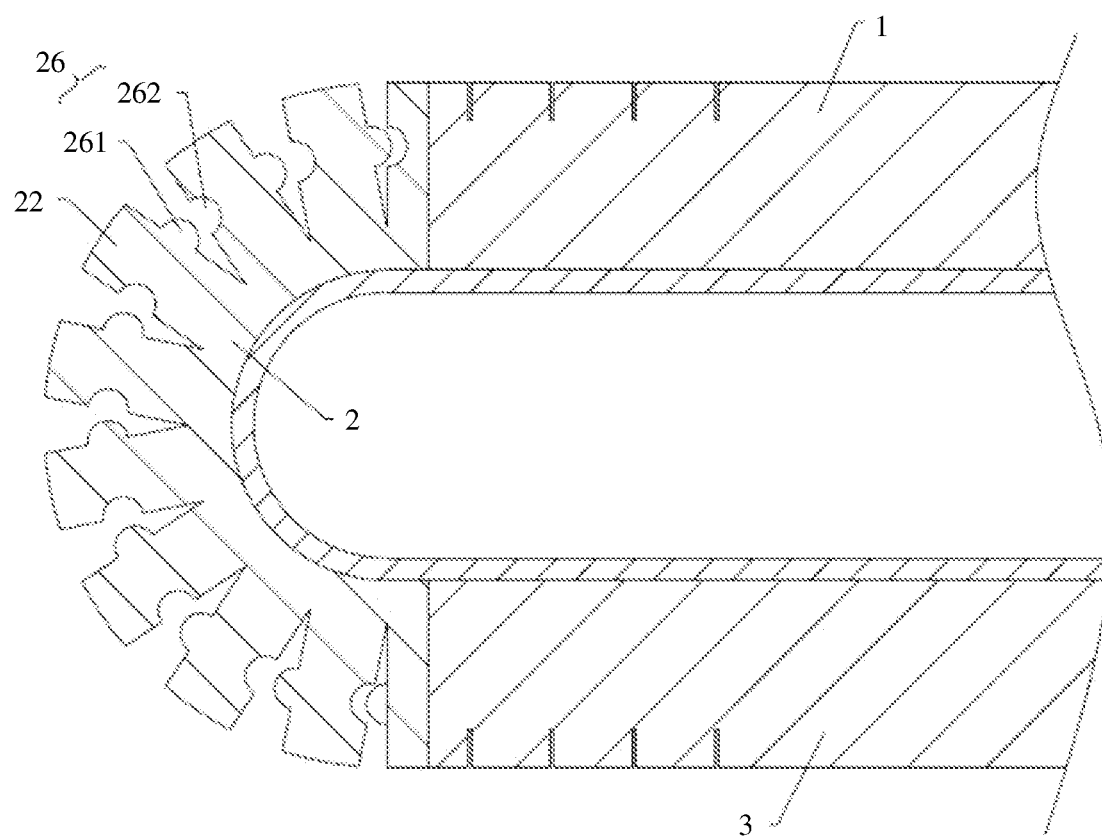
FIG. 16 is a schematic diagram of a structure obtained after the structure shown in FIG. 15 is folded.

FIG. 14 is a schematic structural diagram of a structure that is of the electronic device 100 shown in FIG. 4 and that is at a position B according to still some other embodiments. FIG. 15 is a schematic diagram of a cross section that is obtained by cutting the structure shown in FIG. 14 along a line E-E. FIG. 16 is a schematic diagram of a structure obtained after the structure shown in FIG. 15 is folded.

A concave-convex fitting structure 26 is formed between two adjacent convex parts 22, and the concave-convex fitting structure 26 includes a bump 261 formed in one of the convex parts 22 and a groove 262 formed in the other convex part 22. As shown in FIG. 15, when the first housing 1 and the second housing 3 are flattened relative to each other, the bump 261 is embedded into the groove 262. In this case, a stable relative position relationship is kept between the two adjacent convex parts 22 due to fitting between the bump 261 and the groove 262, and the flexible connecting piece 2 can keep in a flattened state, so that the first housing 1 and the second housing 3 keep flattened relative to each other. As shown in FIG. 16, when the first housing 1 and the second housing 3 are folded relative to each other, the bump 261 is detached from the groove 262, so that the flexible connecting piece 2 can be freely bent.

There may be one or more concave-convex fitting structures 26 between two adjacent convex parts 22. In the embodiment described in FIG. 14, there are two concave-convex fitting structures 26 between two adjacent convex parts 22, and the two concave-convex fitting structures 26 are separated from each other in the first direction X. In some other embodiments, alternatively, there may be one or at least three concave-convex fitting structures 26 between two adjacent convex parts 22.

In some embodiments, as shown in FIG. 16, each convex part 22 includes a bump 261 and a groove 262, and the bump 261 and the groove 262 are disposed opposite to each other on two sides of the convex part 22. In some other embodiments, bumps are disposed on both sides of each of some convex parts 22, and grooves are disposed on both sides of another convex part 22 adjacent to the convex part 22. Positions and shapes of the bump and the groove, and quantities of bumps and grooves in the concave-convex fitting structure 26, and the like are not strictly limited in this application.

In some other embodiments, the electronic device 100 further includes a spring, and the spring is embedded into the flexible connecting piece 2. When the first housing 1 and the second housing 3 are flattened relative to each other, the spring is in a usual state. In this case, because elastic force that makes the spring restore to the usual state is generated when the spring is deformed, when the first housing 1 and the second housing 3 are flattened relative to each other, if the first housing 1 tends to be bent relative to the second housing 3 when being subject to external force, the spring generates elastic force to prevent or slow down the trend. In this case, the first housing 1 and the second housing 3 keep flattened relative to each other.

In some other embodiments, the electronic device 100 further includes one or more constant-force springs. The constant-force spring is embedded into the flexible connecting piece 2, and an extension direction of the constant-force spring is parallel to a direction from the first housing 1 to the second housing 3 (that is, the first direction X). When there are a plurality of constant-force springs, an arrangement direction of the plurality of constant-force springs is perpendicular to the direction from the first housing 1 to the second housing 3. When the first housing 1 and the second housing 3 are folded relative to each other, one or more constant-force springs are in a bent state. When the first housing 1 and the second housing 3 are flattened relative to each other, one or more constant-force springs are in a flattened state, and can keep in the flattened state to support the flexible connecting piece 2.

Figure 17:
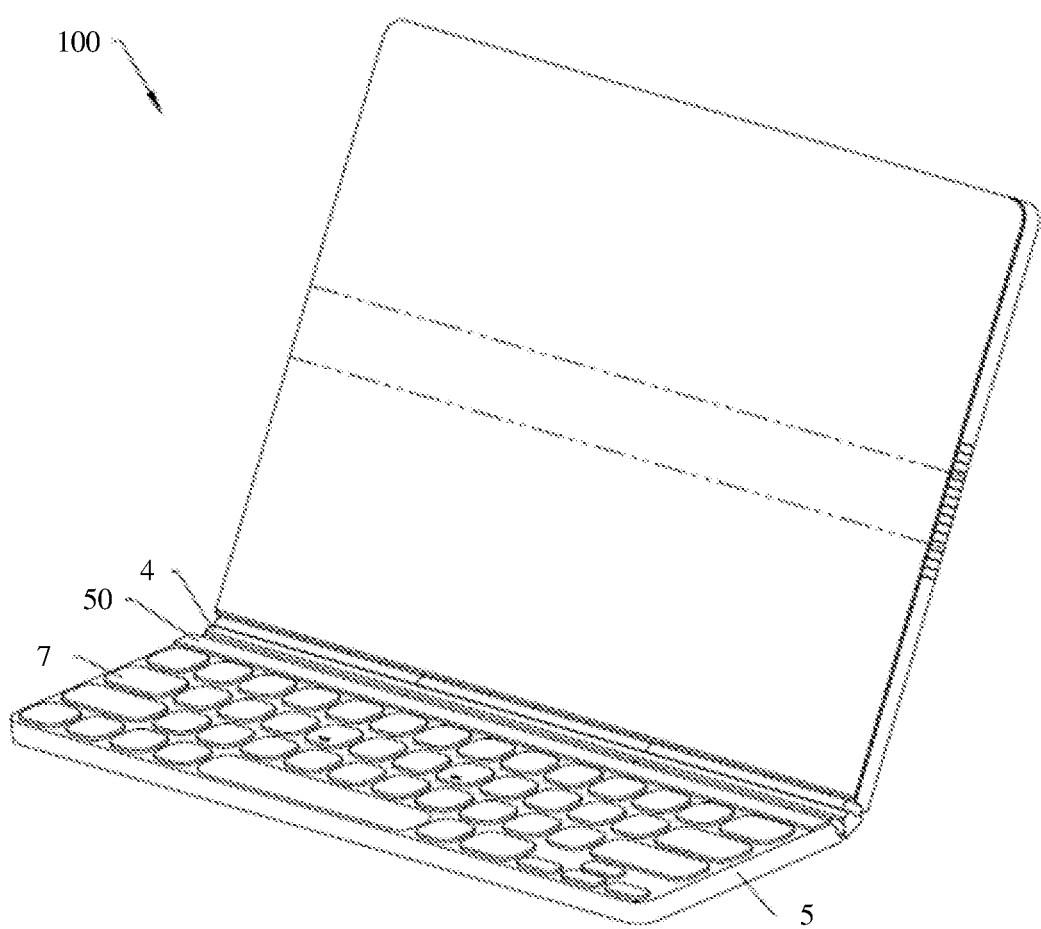
FIG. 17 is a schematic structural diagram of an electronic device in a second physical form according to another embodiment of this application.

FIG. 17 is a schematic structural diagram of an electronic device 100 in a second physical form according to another embodiment of this application. A main difference between this embodiment and the embodiment described in FIG. 1 in that the electronic device 100 further includes a touch display bar 50, and the touch display bar 50 is fastened to the third housing 5 and is located between the keypad assembly 7 and the rotating shaft 4. In this embodiment, a user may implement input by using the touch display bar 50 and the keypad assembly 7, and input modes of the electronic device 100 are more diversified, so that user experience is better.

In some embodiments, the touch display bar 50 may display editing controls (for example, a volume increase control, a volume decrease control, a brightness increase control, a brightness decrease control, a Bluetooth switch control, and a page switching control) and application controls (for example, a start control, a quick start bar control, an input bar control, a volume control, a network connection control, and a desktop display control). The user may implement accurate input by touching a corresponding control. In some other embodiments, the touch display bar 50 may display item controls (volume, brightness, color, expression, page switching, and the like). The user may select an item by touching a corresponding item control, and then accurately adjust the corresponding item by performing a sliding operation on the touch display bar 50. For example, after the user selects a volume item by touching a volume control, a volume is turned up when the user slides right on the touch display bar 50, and the volume is turned down when the user slides left on the touch display bar 50. In still some other embodiments, the touch display bar 50 includes a plurality of adjustment regions. A plurality of items can be adjusted by using the plurality of adjustment regions. For example, the plurality of adjustment regions include a volume adjustment region, a brightness adjustment region, a color adjustment region, an expression adjustment region, and a page switching region. The user can accurately adjust different items by performing sliding operations in different adjustment regions. For example, if the user slides right in the brightness adjustment region, display brightness of the flexible display 6 is increased; or if the user slides left in the brightness adjustment region, the display brightness of the flexible display 6 is decreased.

Figure 18:
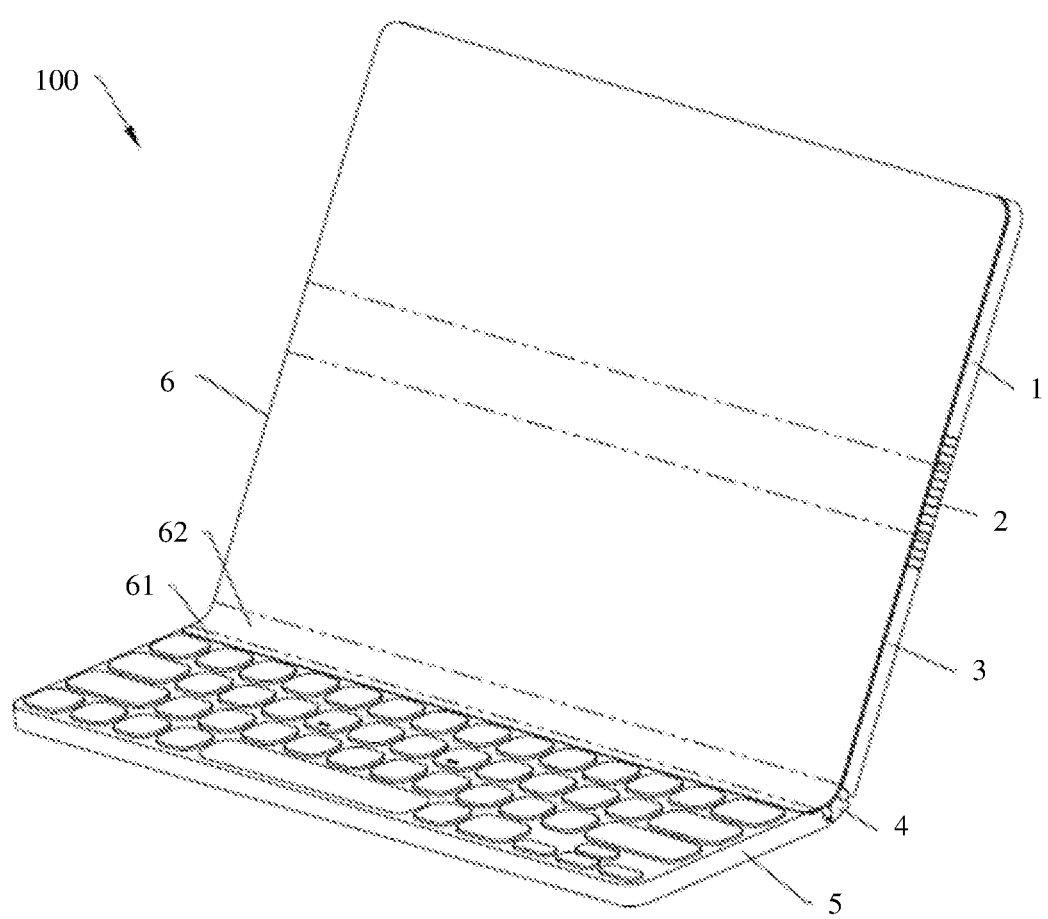
FIG. 18 is a schematic structural diagram of an electronic device in a second physical form according to still another embodiment of this application.

FIG. 18 is a schematic structural diagram of an electronic device 100 in a second physical form according to still another embodiment of this application. A main difference between this embodiment and the embodiment described in FIG. 1 in that the flexible display 6 crosses the rotating shaft 4 and extends to the third housing 5. A part that is of the flexible display 6 and that is located on the third housing 5 is integrated with a touch function and a display function, and the keypad assembly 7 and the flexible display 6 are separated from each other. In other words, the keypad assembly 7 and the flexible display 6 do not overlap. In this embodiment, the flexible display 6 is installed on the first housing 1, the flexible connecting piece 2, the second housing 3, the rotating shaft 4, and a part of the third housing 5.

In this embodiment, the part that is of the flexible display 6 and that is located on the third housing 5 forms a first touch display region 61. A user may implement input by using the first touch display region 61 and the keypad assembly 7, and input modes of the electronic device 100 are more diversified, so that user experience is better. For display and control solutions of the first touch display region 61, refer to the setting of the touch display bar 50 in the foregoing embodiment.

In some embodiments, as shown in FIG. 18, a part that is of the flexible display 6 and that is located on the rotating shaft 4 forms a second touch display region 62. The second touch display region 62 and the first touch display region 61 may be spliced to form a touch display region with a relatively large area, to display more controls. In this way, when a touch display requirement is satisfied, an area of the first touch display region 61 can be properly reduced, so that a surface area of the third housing 5 is relatively small, and the electronic device 100 in a third physical form has a smaller surface area and is more convenient to carry and store.

It can be understood that, in some usage environments, the first touch display region 61 and the second touch display region 62 may also be used to display an image together with other regions of the flexible display 6, so that the electronic device 100 implements larger-screen display, and viewing experience of the user is better. In this case, a corresponding control may be invoked in the first touch display region 61 and the second touch display region 62 based on an invocation operation of the user.

Figure 19:
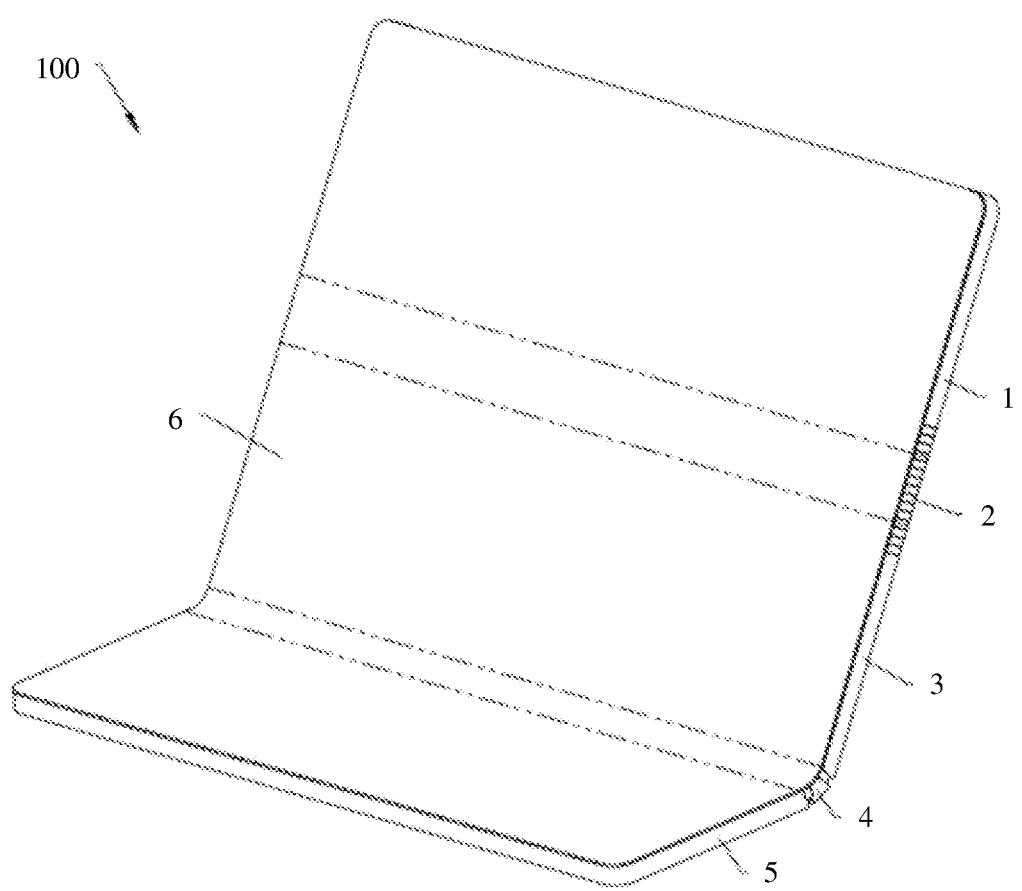
FIG. 19 is a schematic structural diagram of an electronic device in a second physical form according to still another embodiment of this application.

FIG. 19 is a schematic structural diagram of an electronic device 100 in a second physical form according to still another embodiment of this application. A main difference between this embodiment and the embodiment described in FIG. 1 in that no keypad assembly is disposed in the electronic device 100 and the flexible display 6 crosses the rotating shaft 4 and extends to the third housing 5.

In some embodiments, when the electronic device 100 is in the second physical form, the part that is of the flexible display 6 and that is located on the third housing 5 may be used as an input part of the electronic device 100, the part that is of the flexible display 6 and that is located on the rotating shaft 4 may be used as an input part or a display part of the electronic device 100, and a part that is of the flexible display 6 and that is located on the first housing 1, the flexible connecting piece 2, and the second housing 3 may be used as a display part of the electronic device 100. For example, the part that is of the flexible display 6 and that is located on the first housing 1, the flexible connecting piece 2, and the second housing 3 is configured to display an instant messaging window, a search window, a document editing window, and the like, and the part that is of the flexible display 6 and that is located on the third housing 5 is configured to display a virtual keypad. For example, the part that is of the flexible display 6 and that is located on the first housing 1, the flexible connecting piece 2, and the second housing 3 is configured to display a gallery, a read-only document, and the like, and the part that is of the flexible display 6 and that is located on the third housing 5 is configured to display a shortcut operation control such as an up/down switch control.

In some embodiments, when the electronic device 100 is in a first physical form, the flexible display 6 may be used as a display part of the electronic device 100, or may be used as both a display part and an input part of the electronic device 100. For example, the flexible display 6 is configured to display continuous input windows, a document, a picture, and a video.

In some embodiments, the electronic device 100 further includes a soft transparent pad (not shown in the figure). The soft transparent pad covers the part that is of the flexible display 6 and that is located on the third housing 5. In some usage scenarios, the part that is of the flexible display 6 and that is located on the third housing 5 may display a graphic such as an icon or a keypad, and light of the graphic on this part passes through the soft transparent pad for display. A user may indirectly touch, by touching the soft transparent pad, the part that is of the flexible display 6 and that is located on the third housing 5, to implement input. Because the soft transparent pad provides a relatively good touch hand feeling, the soft transparent pad helps to improve experience of performing input on the electronic device 100 by the user.

Figure 20:
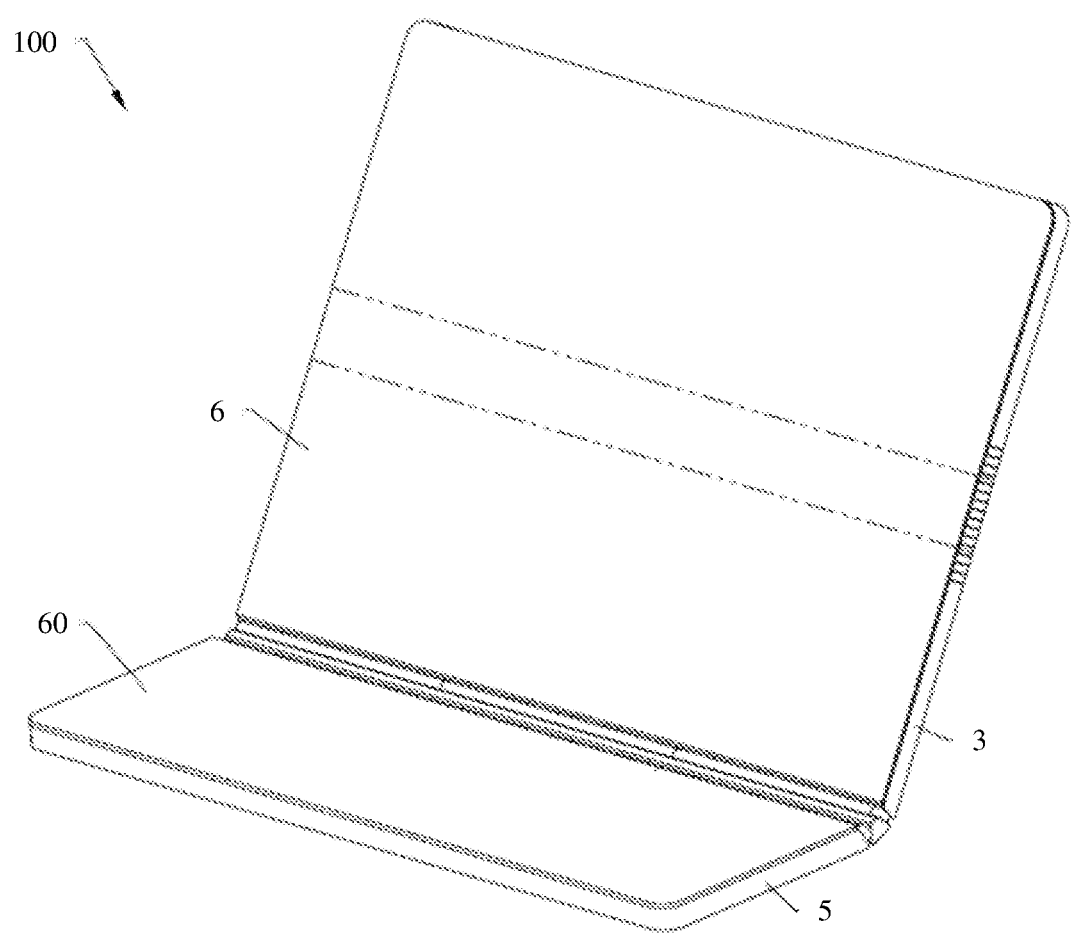
FIG. 20 is a schematic structural diagram of an electronic device in a second physical form according to still another embodiment of this application.

FIG. 20 is a schematic structural diagram of an electronic device 100 in a second physical form according to still another embodiment of this application. A main difference between this embodiment and the embodiment described in FIG. 1 in that the electronic device 100 further includes a touchscreen 60, and the touchscreen 60 is fastened to the third housing 5. When the third housing 5 and the second housing 3 are flattened relative to each other, an orientation of the touchscreen 60 is the same as an orientation of the flexible display 6. When the electronic device 100 is in a first physical form or the second physical form, the touchscreen 60 may be used as an input part of the electronic device 100, and the flexible display 6 may be used as a display part of the electronic device 100.

In some embodiments, the touchscreen 60 may be a touch display, or may merely be a touchscreen, for example, a click pad or a hand-painted tablet. When the touchscreen 60 is a touch display, in some usage scenarios, the touchscreen 60 may also be used as a display part of the electronic device 100, and implement double-screen display together with the flexible display 6, to increase a display area of the electronic device 100.

In some embodiments, the touchscreen 60 may be a flexible display such as an organic light-emitting diode display, may be a rigid display such as a liquid crystal display, or may be an electronic ink display.

In the foregoing embodiment, as shown in FIG. 1, thicknesses of the first housing 1, the second housing 3, and the third housing 5 (a size of the electronic device 100 in the third direction Z) are equal or approximate to each other. In some other embodiments, alternatively, the thicknesses of the first housing 1, the second housing 3, and the third housing 5 may be designed in another manner.

Figure 21:
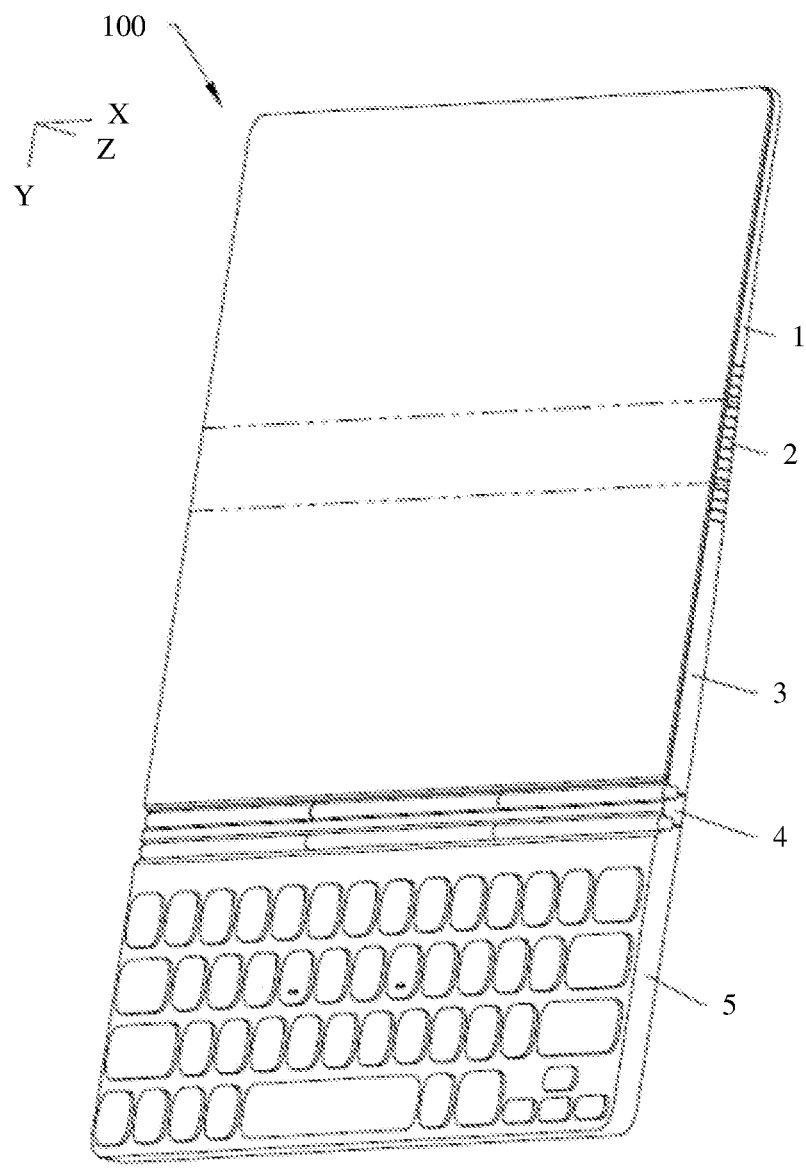
FIG. 21 is a schematic structural diagram of an electronic device in a first physical form according to another embodiment of this application.
Figure 22:
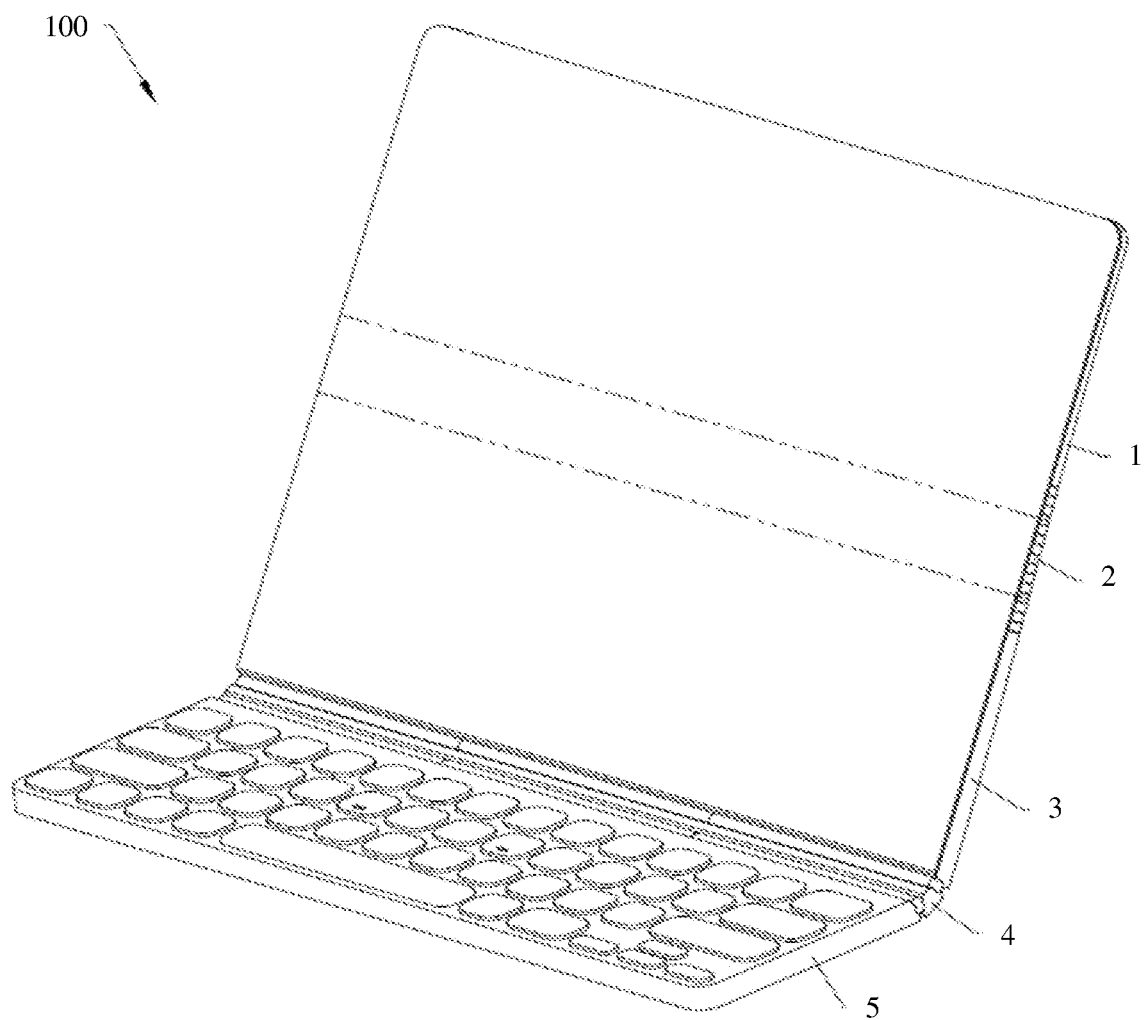
FIG. 22 is a schematic structural diagram of the electronic device shown in FIG. 21 that is in a second physical form.
Figure 23:
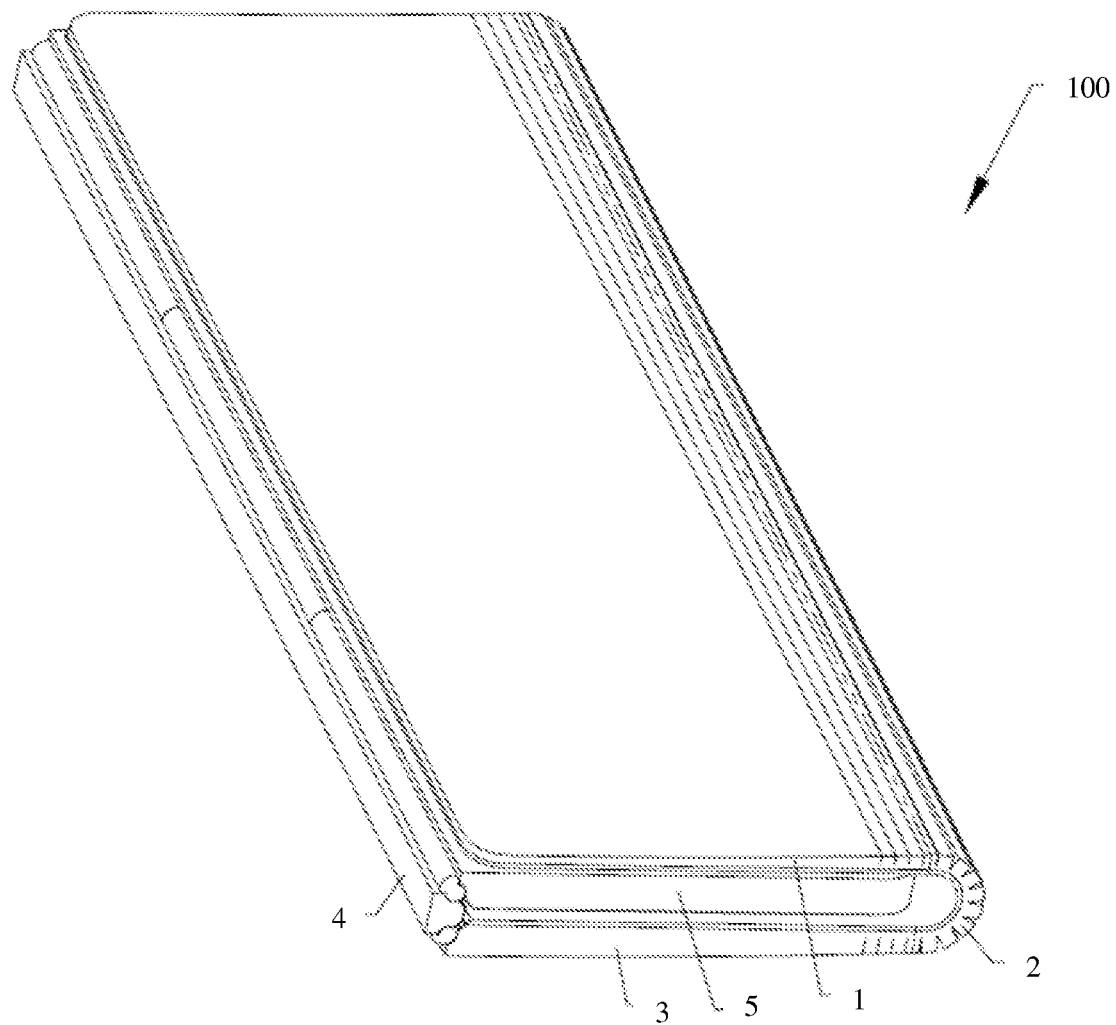
FIG. 23 is a schematic structural diagram of the electronic device shown in FIG. 21 that is in a third physical form.

For example, reference is made to FIG. 21 to FIG. 23. FIG. 21 is a schematic structural diagram of an electronic device 100 in a first physical form according to another embodiment of this application. FIG. 22 is a schematic structural diagram of the electronic device 100 shown in FIG. 21 that is in a second physical form. FIG. 23 is a schematic structural diagram of the electronic device 100 shown in FIG. 21 that is in a third physical form.

As shown in FIG. 21, a thickness of the second housing 3 and a thickness of the first housing 1 progressively decrease in a direction that is parallel to the second direction Y and that is away from the third housing 5, and a thickness of the third housing 5 is greater than or equal to a thickness of the side that is of the second housing 3 and that is close to the third housing 5. In this embodiment, the thicknesses of the second housing 3 and the first housing 1 are relatively small, making the electronic device 100 become lighter and thinner. The thicknesses of the second housing 3 and the first housing 1 gradually decrease in the direction away from the third housing 5. This is also conducive to improving appearance consistency of the electronic device 100. When holding or supporting the electronic device 100, a user usually holds or supports the electronic device 100 at the third housing 5 of the electronic device 100. A decrease in the thicknesses of the second housing 3 and the first housing 1 is also conducive to improving stability of holding or supporting the electronic device 100 during use of the electronic device 100, thereby helping to improve use experience.

In some embodiments, as shown in FIG. 21, a thickness of a side that is of the flexible connecting piece 2 and that is connected to the second housing 3 is greater than a thickness of a side that is of the flexible connecting piece 2 and that is connected to the first housing 1, and a thickness of the flexible connecting piece 2 progressively decreases in a direction away from the second housing 3. The thickness of the side that is of the flexible connecting piece 2 and that is connected to the second housing 3 is less than or equal to a thickness of a side that is of the second housing 3 and that is connected to the flexible connecting piece 2. In this case, the thickness of the second housing 3, the thickness of the flexible connecting piece 2, and the thickness of the first housing 1 progressively decrease in the direction that is parallel to the second direction Y and that is away from the third housing 5.

In some embodiments, as shown in FIG. 21, a thickness of the rotating shaft 4 is less than or equal to the thickness of the third housing 5, and is greater than or equal to the thickness of the side that is of the second housing 3 and that is close to the third housing 5.

In some embodiments, all or most of modules of the electronic device 100 other than the flexible display 6 may be installed in the third housing 5, and no other modules are installed in the second housing 3 or a small quantity of modules with small thicknesses and light weight are installed in the second housing 3.

As shown in FIG. 22, the electronic device 100 is in the second physical form. Because the second housing 3 and the first housing 1 are relatively thin, the rotating shaft 4 can make, by providing relatively small torque, the second housing 3 and the first housing 1 stabilized at a position desired by the user. Therefore, reliability of performing stepless adjustment by using the rotating shaft 4 is relatively high.

As shown in FIG. 23, the electronic device 100 is in the third physical form. Because the second housing 3 and the first housing 1 are relatively thin, the folded electronic device 100 has a relatively small overall thickness, and therefore has better portability.

In the foregoing embodiment, as shown in FIG. 1, a slit (that is, the third slit 21) in the flexible connecting piece 2 is fused to the appearance texture of the electronic device 100, so that the electronic device 100 has relatively good appearance consistency. In some other embodiments, alternatively, in the electronic device 100, the slit on the flexible connecting piece 2 may be covered to improve appearance consistency of the electronic device 100.

Figure 24:
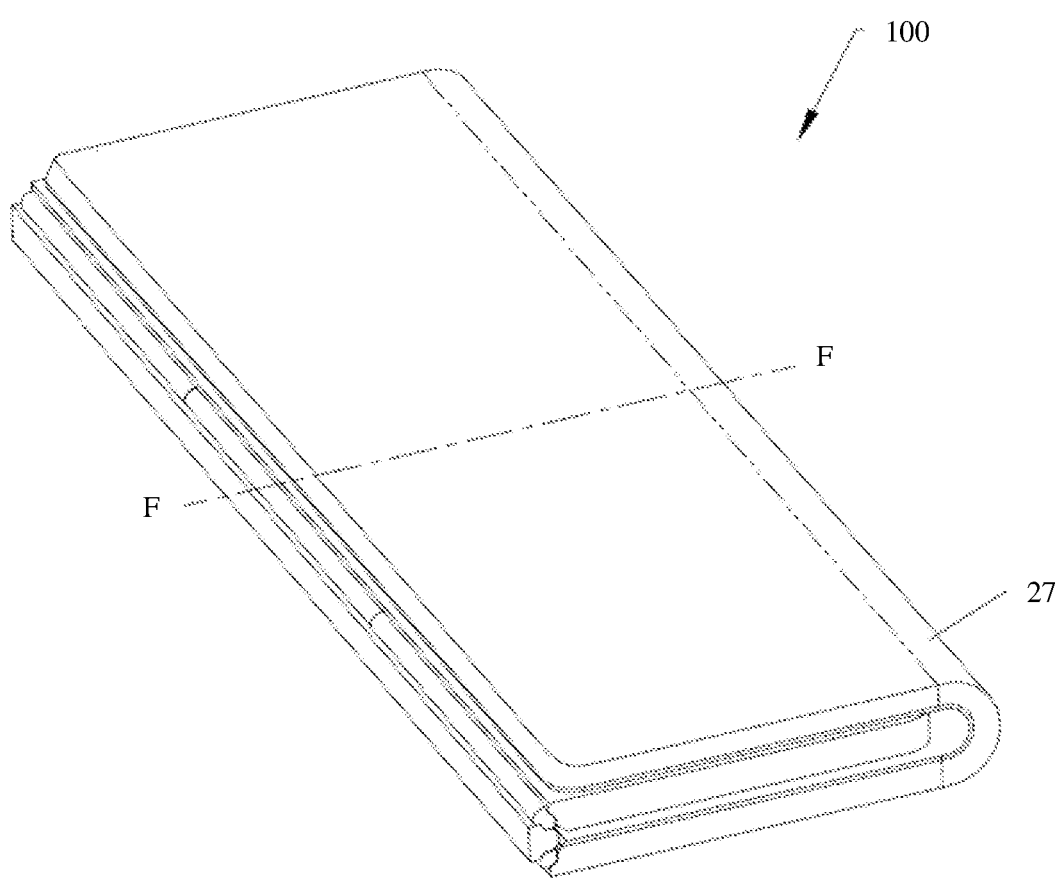
FIG. 24 is a schematic structural diagram of an electronic device in a third physical form according to another embodiment of this application.
Figure 25:
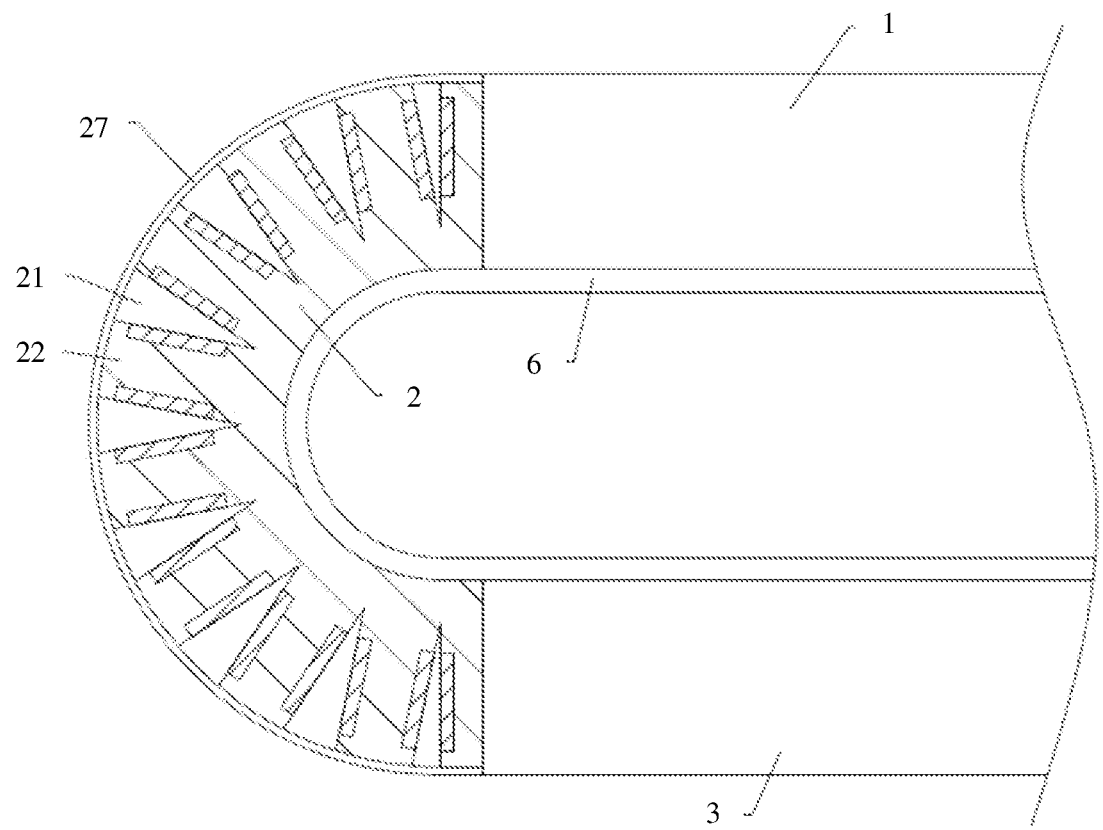
FIG. 25 is a schematic cross-sectional diagram of a part of a structure that is of the electronic device shown in FIG. 24 and that is obtained by cutting along a line F-F according to some embodiments.

For example, reference is made to both FIG. 24 and FIG. 25. FIG. 24 is a schematic structural diagram of an electronic device 100 in a third physical form according to another embodiment of this application. FIG. 25 is a schematic sectional diagram of a part of a structure that is of the electronic device 100 shown in FIG. 24 and that is obtained by cutting along a line F-F according to some embodiments. In FIG. 25, a third housing of the electronic device 100 is not shown.

A difference between this embodiment and the foregoing embodiment lies in that the first housing 1 is not provided with a plurality of first slits, and the second housing 3 is not provided with a plurality of third slits. The electronic device 100 further includes a protective layer 27, and the protective layer 27 covers the flexible connecting piece 2 and the plurality of third slits 21 of the flexible connecting piece 2. The protective layer 27 is made of a flexible material, including but not limited to leather, microfiber, and silica gel. When the electronic device 100 is in the third physical form, the protective layer 27 is roughly arc-shaped.

In this embodiment, the protective layer 27 may cover the plurality of third slits 21, so that appearance consistency of the electronic device 100 can be improved. In addition, the protective layer 27 may further mitigate a risk that external dust enters the third slits 21, to ensure reliability and a service life of the flexible connecting piece 2.

In some embodiments, the protective layer 27 is fastened to outer surfaces that are of the plurality of convex parts 22 of the flexible connecting piece 2 and that are away from the flexible display 6. In this way, the protective layer 27 is reliably connected to the flexible connecting piece 2, and can move along with the plurality of convex parts 22 of the flexible connecting piece 2.

Figure 26:
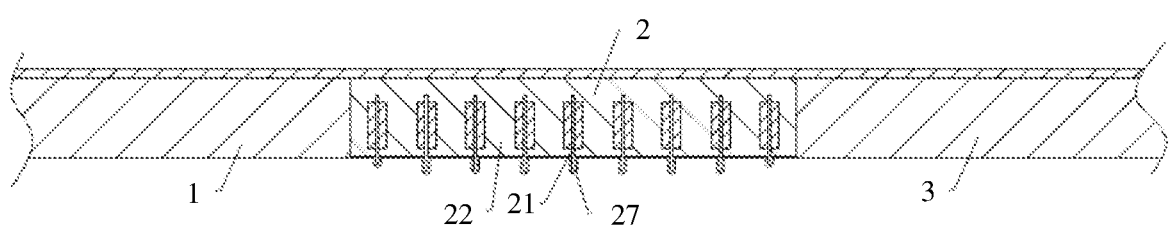
FIG. 26 is a schematic diagram of a structure obtained after the structure shown in FIG. 25 is flattened.

As shown in FIG. 26, FIG. 26 is a schematic diagram of a structure obtained after the structure shown in FIG. 25 is flattened. When the first housing 1 and the second housing 3 are expanded relative to each other, the plurality of convex parts 22 of the flexible connecting piece 2 are closed to each other, the protective layer 27 moves along with the plurality of convex parts 22, and a part that is of the protective layer 27 and that faces the plurality of slits 21 is folded and protrudes. In this case, the protective layer 27 can present a natural change of compressive folds in a texture as the flexible connecting piece 2 is folded or expanded.

In some embodiments, appearance, a color, a material, and the like of the protective layer 27 may be similar to or the same as an appearance part (for example, the flexible cladding layer) of the first housing 1 and an appearance part (for example, the flexible cladding layer) of the second housing 3, thereby further improving appearance consistency of the electronic device 100.

Figure 27:
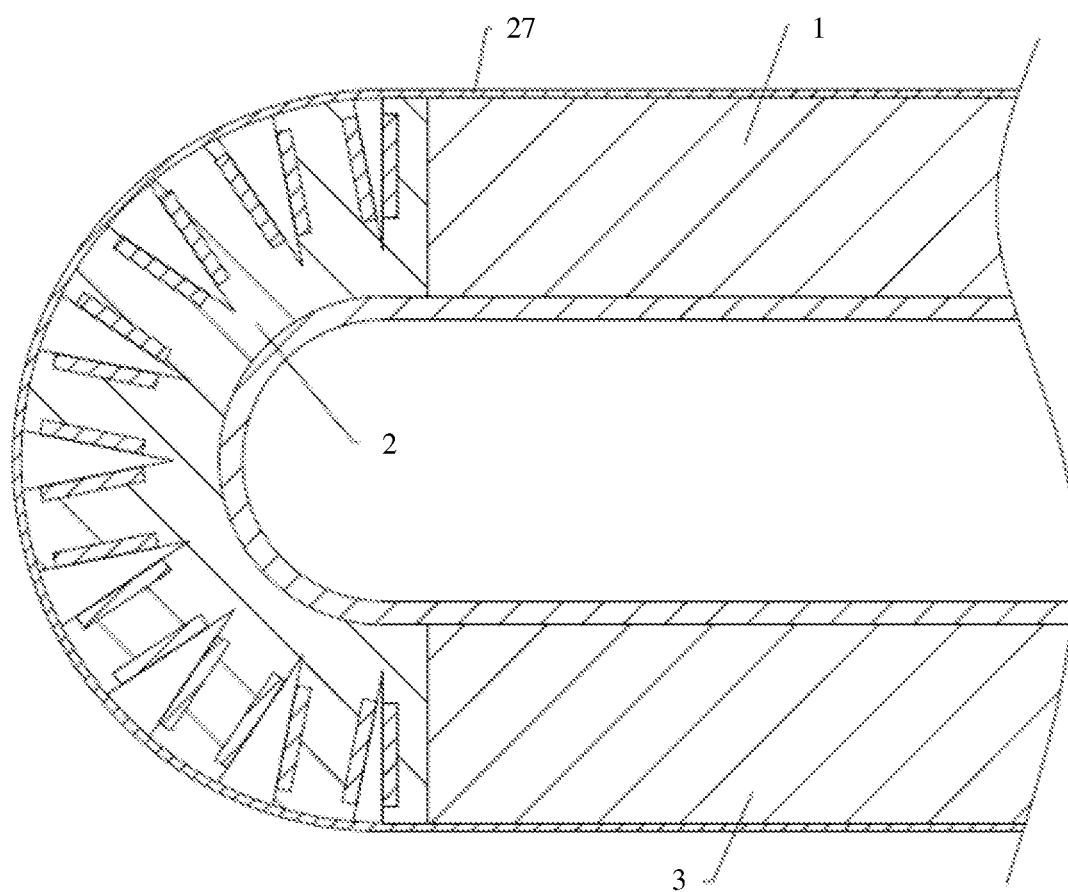
FIG. 27 is a schematic cross-sectional diagram of a part of a structure that is of the electronic device shown in FIG. 24 and that is obtained by cutting along a line F-F according to some other embodiments.

FIG. 27 is a schematic sectional diagram of a part of a structure that is of the electronic device 100 shown in FIG. 24 and that is obtained by cutting along a line F-F according to some embodiments. A main difference between this embodiment and the foregoing embodiment lies in that a side of the protective layer 27 extends to the first housing 1, and partially or completely covers the first housing 1. The other side of the protective layer 27 extends to the second housing 3, and partially or completely covers the second housing 3. In other words, the protective layer 27 is fastened to the first housing 1, the flexible connecting piece 2, and the second housing 3.

FIG. 28 is a schematic cross-sectional diagram of a part of a structure that is of the electronic device 100 shown in FIG. 24 and that is obtained by cutting along a line F-F according to still some other embodiments. FIG. 29 is a schematic diagram of a structure obtained after the structure shown in FIG. 28 is flattened.

A main difference between this embodiment and the foregoing embodiment lies in that the electronic device 100 uses a simple hinge structure 281 instead of the flexible connecting piece, and two sides of the hinge structure 281 are respectively connected to the first housing 1 and the second housing 3. A protective layer 282 covers the hinge structure 281 to improve appearance consistency of the electronic device 100, and presents a natural change of compressive folds in a texture during movement of the hinge structure 281.

It can be understood that, the hinge structure 281 in this embodiment is different from a structure of the rotating shaft 4 of the electronic device 100. The hinge structure 281 in this embodiment only needs to satisfy folding and flattening requirements, and the hinge structure 281 is simpler and is easy to implement.

FIG. 30 is a schematic diagram of an internal structure of an electronic device 100 in a third physical form according to still another embodiment of this application. FIG. 31 is a schematic diagram of a structure obtained after the structure shown in FIG. 30 is flattened.

A difference between this embodiment and the foregoing embodiment lies in that the electronic device 100 further includes a spring 291 (shown by a bold line in the figure) and a protective layer 292. A first groove 18 is disposed on a side that is of the first housing 1 and that faces the flexible connecting piece 2, and one end of the spring 291 extends into the first groove 18 and is fastened to the first housing 1. A second groove 38 is disposed on a side that is of the second housing 3 and that faces the flexible connecting piece 2, the other end of the spring 291 extends into the second groove 38 and is fastened to the second housing 3, and the spring 291 covers the flexible connecting piece 2. The protective layer 292 covers a side that is of the spring 291 and that is away from the flexible connecting piece 2. The protective layer 292 moves along with the spring 291. Appearance, a color, a material, and the like of the protective layer 292 may be similar to or the same as an appearance part (for example, the flexible cladding layer) of the first housing 1 and an appearance part (for example, the flexible cladding layer) of the second housing 3. A middle part of the spring 291 may be partially fastened relative to the flexible connecting piece 2, to mitigate a risk that the spring 291 falls off.

In this embodiment, the electronic device 100 implements folding and expansion between the first housing 1 and the second housing 3 by using a characteristic that the flexible connecting piece 2 and the spring 291 are deformable. The structure is simple and is easy to implement. In a process in which the flexible connecting piece 2 and the spring 291 are deformed, a shape change of the spring 291 forms a part of appearance of the electronic device 100, thereby diversifying the appearance of the electronic device 100. This is conducive to improving use experience of a user.

In the foregoing embodiments, the electronic device 100 is of a tri-fold structure, and the electronic device 100 includes the first housing 1, the flexible connecting piece 2, the second housing 3, the rotating shaft 4, and the third housing 5. In some other embodiments, different from the foregoing embodiments, the electronic device 100 is of a double-fold structure, and the electronic device 100 includes the first housing 1, the flexible connecting piece 2, and the second housing 3. When no conflict exists, the solutions in the foregoing embodiments can be applied to this embodiment.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. When no conflict occurs, the embodiments of this application and features in the embodiments may be mutually combined. Therefore, the protection scope of this application shall be subject to the protection scope of the claims.

What is claimed is:

1. An electronic device, comprising a flexible display, a first housing, a second housing, and a flexible connecting piece, wherein a first side of the flexible connecting piece is connected to the first housing, and a second side of the flexible connecting piece is connected to the second housing; the flexible connecting piece is deformable so that the first housing and the second housing are folded or flattened relative to each other; and the flexible display is fastened to the first housing, the flexible connecting piece and the second housing; and wherein a plurality of first slits are disposed on a side of the first housing that faces away from the flexible display; a plurality of second slits are disposed on a side of the second housing that faces away from the flexible display; a plurality of third slits are disposed on a side of the flexible connecting piece that faces away from the flexible display, and a convex part is formed between two adjacent third slits; and extension directions of the plurality of first slits, the plurality of second slits and the plurality of third slits are parallel to a first direction; and wherein a depth of each third slit is greater than a depth of each first slit and a depth of each second slit.

2. The electronic device according to claim 1, wherein the plurality of first slits, the plurality of third slits, and the plurality of second slits are arranged at equal intervals.

3. The electronic device according to claim 1, wherein a first slit pattern is on the side that is of the first housing and that faces away from the flexible display, the first slit pattern comprises the plurality of first slits and a plurality of fourth slits, and the plurality of fourth slits intersects with or is parallel to the plurality of first slits; and a second slit pattern is on the side that is of the second housing and that faces away from the flexible display, a third slit pattern is on the side that is of the flexible connecting piece and that faces away from the flexible display, and the third slit pattern, the second slit pattern and the first slit pattern are the same.

4. The electronic device according to claim 1, wherein the electronic device further comprises a plurality of magnetic attachment assemblies, each magnetic attachment assembly comprises a first magnetic attachment member and a second magnetic attachment member that are attached to each other, at least one magnetic attachment assembly is correspondingly disposed in each third slit, the first magnetic attachment member and the second magnetic attachment member of the at least one magnetic attachment assembly are respectively disposed in two convex parts located on two sides of a corresponding third slit, and the first magnetic attachment member and the second magnetic attachment member are disposed opposite to each other.

5. The electronic device according to claim 1, wherein the first housing defines a first channel, the second housing defines a second channel, a plurality of convex parts of the flexible connecting piece define a third channel, the third channel crosses the plurality of third slits, and the third channel is connected to the first channel and the second channel;

the electronic device further comprises a first memory metal piece and a second memory metal piece; and when the first housing and the second housing are folded relative to each other, the first memory metal piece and the second memory metal piece are powered off, the first memory metal piece is located on the first channel, and the second memory metal piece is located on the second channel; or when the first housing and the second housing are flattened relative to each other, the first memory metal piece and the second memory metal piece are powered on, the first memory metal piece is heated and elongated, one end of the first memory metal piece extends into the third channel, the second memory metal piece is heated and elongated, and one end of the second memory metal piece extends into the third channel.

6. The electronic device according to claim 1, wherein a plurality of convex parts of the flexible connecting piece define a deformation channel, and the deformation channel crosses the plurality of third slits;

the electronic device further comprises a memory metal piece, the memory metal piece is located in the deformation channel, a first end of the memory metal piece is fixedly connected to the first housing, and a second end of the memory metal piece is fixedly connected to the second housing; and when the first housing and the second housing are folded relative to each other, the memory metal piece is elongated and bent along with the flexible connecting piece; or when the first housing and the second housing are flattened relative to each other, the memory metal piece is shortened and flattened after being powered on and heated.

7. The electronic device according to claim 1, wherein a concave-convex fitting structure is between two adjacent convex parts of the flexible connecting piece, and the concave-convex fitting structure comprises a bump in one of the two adjacent convex parts and a groove formed in the other convex part of the two adjacent convex parts; and when the first housing and the second housing are flattened relative to each other, the bump is embedded into the groove.

8. The electronic device according to claim 1, wherein the electronic device further comprises a rotating shaft and a third housing; the third housing is located on a side that is of the second housing and that faces away from the first housing; a first side of the rotating shaft is connected to the second housing, and a second side of the rotating shaft is connected to the third housing; and the rotating shaft is deformable so that the second housing and the third housing are flattened, folded, or partially expanded relative to each other; and when the electronic device is in a first physical form, the second housing and the third housing are folded relative to each other, the first housing and the second housing are folded relative to each other, and the third housing is located between the first housing and the second housing.

9. The electronic device according to claim 8, wherein the electronic device further comprises a keypad assembly, and the keypad assembly is fastened to the third housing; and when the electronic device is in a second physical form, the third housing and the second housing are flattened relative to each other, the second housing and the first housing are flattened relative to each other, and an orientation of the keypad assembly is the same as an orientation of the flexible display.

10. The electronic device according to claim 9, wherein the flexible display crosses the rotating shaft and extends to the third housing, a part of the flexible display that is located on the third housing is integrated with a touch function and a display function of the electronic device, and the keypad assembly and the flexible display are separated from each other.

11. The electronic device according to claim 9, wherein the electronic device further comprises a touch display bar, and the touch display bar is fastened to the third housing and is located between the keypad assembly and the rotating shaft.

12. The electronic device according to claim 8, wherein the electronic device further comprises a touchscreen, and the touchscreen is fastened to the third housing; and when the electronic device is in a first physical form, the third housing and the second housing are flattened relative to each other, the second housing and the first housing are flattened relative to each other, and an orientation of the touchscreen is the same as an orientation of the flexible display.

13. The electronic device according to claim 8, wherein a thickness of the second housing and a thickness of the first housing progressively decrease in a direction that is parallel to a second direction and that is away from the third housing, and a thickness of the third housing is greater than or equal to a thickness of a side that is of the second housing and that is close to the third housing.

14. The electronic device according to claim 1, wherein when the first housing and the second housing are folded relative to each other, the flexible display is folded and is located inside the first housing, the flexible connecting piece and the second housing, and a plurality of convex parts of the flexible connecting piece are opened from each other by using the plurality of third slits.

15. The electronic device according to claim 1, wherein when the first housing and the second housing are flattened relative to each other, the flexible display is flattened, a plurality of convex parts of the flexible connecting piece are closed to each other, the plurality of first slits, the plurality of third slits, and the plurality of second slits are sequentially arranged in a second direction, and the second direction is perpendicular to the first direction.

16. The electronic device according to claim 1, wherein the plurality of third slits are arranged at equal intervals, the plurality of first slits are arranged at intervals that gradually change, and the plurality of second slits are arranged at intervals that gradually change.

\* \* \* \* \*